United States Patent
Park

(10) Patent No.: US 10,922,626 B2
(45) Date of Patent: Feb. 16, 2021

(54) CONDITIONAL BRANCH IN MACHINE LEARNING OBJECT DETECTION

(71) Applicant: QUALCOMM Incorporated, San Diego, CA (US)

(72) Inventor: Edwin Chongwoo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 16/119,534

(22) Filed: Aug. 31, 2018

(65) Prior Publication Data

US 2019/0279040 A1    Sep. 12, 2019

Related U.S. Application Data

(60) Provisional application No. 62/641,151, filed on Mar. 9, 2018.

(51) Int. Cl.
| | | |
|---|---|---|
| *G06K 9/00* | (2006.01) | |
| *G06N 20/00* | (2019.01) | |
| *G06K 9/62* | (2006.01) | |

(52) U.S. Cl.
CPC ......... *G06N 20/00* (2019.01); *G06K 9/00973* (2013.01); *G06K 9/628* (2013.01); *G06K 9/6227* (2013.01); *G06K 9/6262* (2013.01); *G06K 9/6282* (2013.01)

(58) Field of Classification Search
None
See application file for complete search history.

(56) References Cited

U.S. PATENT DOCUMENTS

| | | | |
|---|---|---|---|
| 8,805,081 B2 | 8/2014 | Chotard et al. | |
| 2006/0257017 A1 | 11/2006 | Luo | |
| 2010/0053362 A1* | 3/2010 | Nanu | G06K 9/0061 348/222.1 |
| 2012/0120269 A1 | 5/2012 | Capata et al. | |
| 2014/0286527 A1* | 9/2014 | Harthattu | G06K 9/6257 382/103 |
| 2015/0036942 A1* | 2/2015 | Smirnov | G06K 9/6257 382/227 |
| 2016/0070989 A1* | 3/2016 | Jang | G06K 9/6807 382/103 |
| 2016/0171344 A1* | 6/2016 | Chen | G06K 9/6203 382/224 |

(Continued)

FOREIGN PATENT DOCUMENTS

| | | |
|---|---|---|
| CN | 101964059 A | 2/2011 |
| WO | 2018003212 A1 | 1/2018 |

*Primary Examiner* — Hadi Akhavannik
(74) *Attorney, Agent, or Firm* — Polsinelli LLP

(57) ABSTRACT

Apparatus, methods, systems, and instructions stored on computer-readable medium are presented for performing classification. A hardware engine may be configurable to implement a plurality of cascade classifiers comprising at least a first cascade classifier and a second cascade classifier, each including one or more stages. The first cascade classifier may be configured to perform a classification different from a classification performed by the second cascade classifier. The hardware engine may be capable of conditionally branching from the first cascade classifier to the second cascade classifier based on an outcome condition associated with evaluating of at least one stage of the first cascade classifier.

30 Claims, 18 Drawing Sheets

(56) References Cited

U.S. PATENT DOCUMENTS

| | | |
|---|---|---|
| 2016/0232423 A1 | 8/2016 | Zhong et al. |
| 2016/0275043 A1 | 9/2016 | Grochowski et al. |
| 2017/0039444 A1* | 2/2017 | Li .................. G06K 9/4647 |
| 2017/0364757 A1* | 12/2017 | Rajabizadeh ...... G06K 9/00805 |
| 2019/0279040 A1* | 9/2019 | Park .................. G06K 9/00973 |
| 2019/0279115 A1 | 9/2019 | Park |

* cited by examiner

Early Fail

CONDITIONAL BRANCH IN MACHINE LEARNING OBJECT DETECTION

CROSS-REFERENCE TO RELATED APPLICATIONS

This application claims the benefit of U.S. Provisional Application No. 62/641,151, filed Mar. 9, 2018, entitled "Conditional Branch and Accumulate Across Stages in Machine Learning Object Detection" which is incorporated herein by reference. This application is related to co-pending U.S. patent application Ser. No. 16/119,668 titled "Accumulate Across Stages in Machine Learning Object Detection," filed Aug. 31, 2018, the entirety of which is hereby incorporated by reference.

BACKGROUND

Aspects of the disclosure relate to machine learning and, in specific embodiments, to improvements in the use of machine learning in visual object detection. Visually based object detection, such as face detection, based on machine learning has tremendous potential for a wide range of interesting and useful applications. By tapping into the capabilities of machine learning, computers can be trained to detect objects in images in powerful and scalable ways. However, such machine-based object detection can be computationally expensive, which can translate to high demands on battery, processing, and memory resources. These issues become particularly acute in mobile, wireless, wearable, and/or other resource-limited environments. While existing machine learning techniques have achieved certain gains in efficiency, the performance of practical system for machine learning based object detection leaves much to be desired for many applications.

For example, in the realm of multiple classifiers, U.S. Patent Publication No. 2012/0120269 ('269 publication) describes a technique in which "[m]ultiple focus-specific classifier chains are applied, including a first chain trained to match significantly out of focus faces, and a second chain trained to match slightly out of focus faces." In a more detailed example, the '269 publication describes three cascade classifiers: (1) a sharply focused classifier, (2) a slightly out-of-focus classifier, and (3) a significantly out-of-focus classifier. See '269 publication, paragraphs [0141]-[0146]. Some or all of these cascade classifiers may be executed at once, but they appear to be executed independently of one another. See '269 publication, [0143]. The '269 publication fails to disclose any conditional branching from one cascade classifier to another cascade classifier.

As further examples, in the realm of accumulated values, U.S. Pat. No. 8,805,081 ('081 patent) describes a method of "performing, by an image processing device, object detection in an image comprising: performing one or more tests of a test sequence for detection of a first object on pixels [sic] values of a plurality of at least partially overlapping sub-regions (310, 312, 314) of a first search window (108); generating a cumulative score based on results of said one or more tests on said plurality of subregions; comparing said cumulative score with a threshold value; and based on said comparison, selectively performing one or more of said tests of said test sequence on at least one further sub-region of said first search window, said at least one further sub-region at least partially overlapping each of said plurality of sub-regions.'"081 patent, Abstract. However, the "cumulative score" (CA) disclosed in the '081 patent is merely an indicator of the depth reached in a cascade, and the cumulative score is not accumulated across stages. A numeric value obtained from evaluation of a first stage is not accumulated with a second numeric value obtained from evaluation of a second stage to generate an accumulated value.

U.S. Patent Publication No. 2006/0257017 ('017 publication) describes a classification method that includes "accessing an image to be analyzed for the presence of a predefined object, processing the image using a plurality of evaluation stages, generating a plurality of scores for respective ones of the evaluation stages responsive to the processing, wherein the scores are indicative of a likelihood of a candidate region of the image comprising the object, accumulating the scores from the evaluation stages to provide a cumulative score, and using the cumulative score, determining whether the candidate region comprises the object." '017 publication, Abstract. However, the technique described in the '017 publication accumulates scores from the evaluation of stages without accessing any value to determine whether to accumulate. For example, "the likelihood scores of the current stage 34 and sages 34 previous in the pipeline may be accumulated yielding a cumulative likelihood score after the kth stage as L_k according to L_k=L_(k−1)+I_k." '017 publication, paragraph [0034]. The likelihood score at each stage L_k is rigidly based on the likelihood of the previous stage L_(k−1), in a pipeline fashion. Accumulation is presumed to always occur in the pipeline, and, as such, there is no need to determine whether the likelihood scores ought to be accumulated. Therefore, there is no accessing of any value to determine whether to accumulate.

BRIEF SUMMARY

Certain apparatuses, methods, systems, and instructions stored on computer-readable medium are presented for performing hardware-based classification. In at least one embodiment, a hardware engine is configurable to implement a plurality of cascade classifiers comprising at least a first cascade classifier and a second cascade classifier, the hardware engine configurable to implement one or more stages within each of the plurality of cascade classifiers. The first cascade classifier and the second cascade classifier may be configured to perform classification based on image data stored in a common image data buffer. The first cascade classifier may be configured to perform a classification different from a classification performed by the second cascade classifier. Also, the hardware engine may be capable of conditionally branching from the first cascade classifier to the second cascade classifier based on an outcome condition associated with evaluating of at least one stage of the first cascade classifier.

The image data stored in the common image data buffer may comprise image data representing a portion of an image, a portion of an integral image, or an integral image of a portion of the image. In one embodiment, the first cascade classifier is configured to perform object detection on a first window size of the image data and the second cascade classifier is configured to perform object detection on a second window size of the image data different from the first window size. In another embodiment, the first cascade classifier is configured to perform object detection of a first object class and the second cascade classifier is configured to perform object detection of a second object class different from the first object class. The outcome condition comprises a branch-on-fail condition corresponding to a failure by the at least one stage of the first cascade classifier to detect an object within a window of the image data stored in the common image data buffer.

Each stage within the each of the plurality of cascade classifiers may correspond to a hardware stage storing stage data to enable the hardware engine to implement each stage, wherein each hardware stage is associated with a unique hardware stage identifier. Hardware stages corresponding to similar logical stages of the first cascade classifier and the second cascade classifier may be assigned hardware stage identifiers within a common range of values. A value may be recorded representing a highest hardware stage identifier reached during an execution of the hardware engine. The hardware engine may have access to memory to enable storing of stage-related data usable by the hardware engine across different cascades of the plurality of cascades. In one embodiment, each stage within the first cascade classifier and the second cascade classifier employs a modular design having similar hardware capabilities as other stages within the first cascade classifier and second cascade classifier.

Also, in at least one embodiment, a hardware engine configurable to implement multiple stages of a cascade classifier including a first stage and a second stage, wherein the hardware engine is configurable to (a) access a value indicative of whether to accumulate, and (b) responsive to the value indicative of whether to accumulate meeting a continue evaluation condition, (i) access a first numeric value obtained from evaluation of the first stage of the cascade classifier, (ii) accumulate the first numeric value with a second numeric value obtained from evaluation of the second stage of the cascade classifier to generate an accumulated value, and (iii) utilize the accumulated value to determine an outcome for the second stage of the cascade classifier.

Upon determining an "early pass" condition based on the first numeric value, the hardware engine may be configured to bypass evaluation of the second stage of the cascade classifier. The early pass condition may comprise the first numeric value meeting an early pass threshold. In one embodiment, the value indicative of whether to accumulate is the first numeric value obtained from the evaluation of the first stage of the cascade classifier. The continue evaluation condition may comprise the first numeric value failing to meet the early pass threshold.

Upon determining an "early fail" condition based on the first numeric value, the hardware engine may be configured to bypass evaluation of the second stage of the cascade classifier. The early fail condition may comprise the first numeric value failing to meet an early-fail-avoid threshold. The continue evaluation condition may comprise the first numeric value meeting the early-fail-avoid threshold.

Furthermore, in at least one embodiment, a hardware engine is configurable to implement multiple stages of a cascade classifier. Here, the cascade classifier may support multiple paths of evaluation through the multiple stages of the cascade classifier, including a first path of evaluation and a second path of evaluation. The hardware engine may be configurable to determine, based on a numeric value associated with evaluation of a stage along the first path, that the first path of evaluation was taken.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
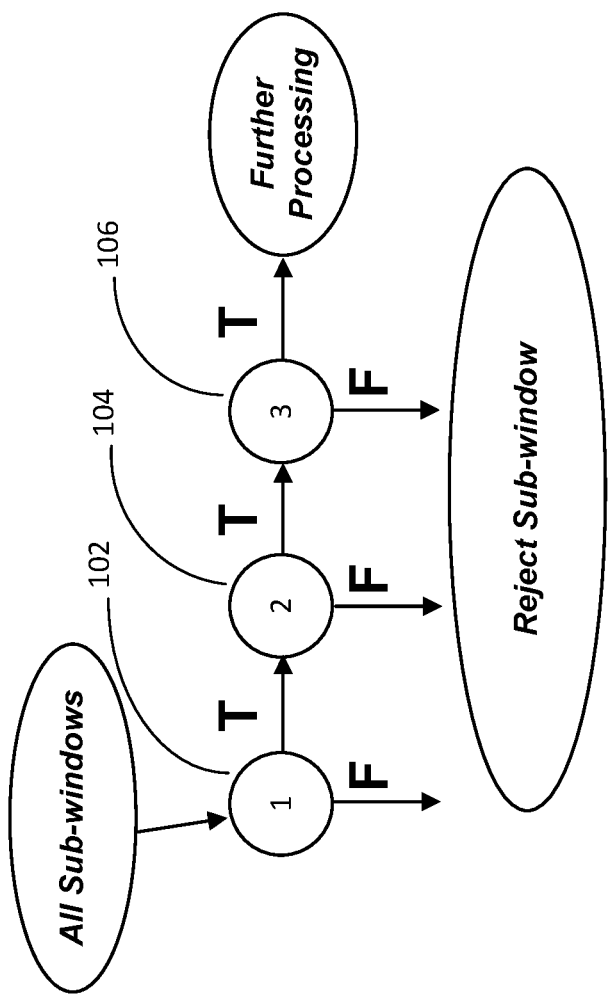
FIG. 1 illustrates the operation of a traditional software cascade classifier.

FIG. 1 illustrates the operation of a traditional cascade classifier. Here, a "classifier" refers to a mechanism capable of generating a decision regarding whether the input data belongs one of a number of possible categories, or classifications. The input data may be, for example, image data. The number of possible classifications may be two (binary classifier) or more (n-ary classifier). In various embodiments of the present disclosure, the classification is performed using a trained machine learning (ML) classifier.

As shown, a cascade classifier 100 may have multiple stages, such as a first stage 102, a second stage 104, and a third stage 106. Given a particular sub-window of an image, the cascade classifier 100 attempts to detect a particular object, such as a face, in the sub-window by performing detection in cascaded stages. In each stage, a plurality of features that tend to indicate the presence of the target object are calculated based on the sub-window of image data. Generally speaking, earlier stages tend to comprise "rougher" features that tend to yield a high detection rate for the target object. Just as an example, if the target object is a face, one feature that may be calculated in the first stage 102 may be a Haar-like feature that measures the difference in the intensity of pixel values between a region where the eyes are expected to be (within the sub-window) and a region where the cheekbones of the face are expected to be (within the sub-window). This particular feature is chosen based on the fact that in most facial images, the eye region generally contains relatively darker pixels when compared to the cheekbone region which generally contain relatively lighter pixels. More than one such feature may be calculated in the first stage 102. The multiple features calculated in a stage produce values (e.g., pixel intensity differences) that may be combined, either by simple addition or by other operation(s), to yield a combined score for the stage. The combined score is then compared to a threshold. Based on the threshold comparison, a binary outcome is determined for the stage. The outcome may be either that detection has been achieved for the stage (e.g., TRUE or "T") or detection has not been achieved for the stage (e.g., FALSE or "F"). As the cascade classifier proceeds to later stages, more "refined" features may be used.

The cascade classifier 100 is referred to as being "cascaded" in the sense that each subsequent stage 104, 106, etc. is evaluated based on the outcome of a previous stage. For instance, if the first stage 102 results in detection ("T"), then the second stage 104 may be evaluated. In other words, if the "rough" features of the first stage 102 that correspond to a face are sufficiently detected, as measured by the threshold comparison within the first stage 102, then the cascade classifier 100 moves ahead to evaluate more refined features contained in the second stage 104. Otherwise, if the first stage 102 results in no detection ("F"), then the sub-window is rejected. That is, if the "rough" features of the first stage 102 are not sufficiently detected, as measured by the threshold comparison within the first stage 102, then the cascade classifier concludes that the sub-window does not contain a face, without evaluating any subsequent stages such as the second stage 104 or third stage 106.

The cascade classifier 100 is efficient in the sense that a sub-window that clearly does not contain a face can be rejected early, without evaluating all of the stages that exist in the classifier and the features contained therein. A sub-window that does contain a face may proceed through the cascade of stages, with confidence growing at each stage that a face may be detected. Once a sufficient level of confidence has been reached, e.g., by achieving detection for a certain number of stages, the cascade classifier 100 may finally conclude that a face is detected. While Haar-like features are used as an example in the discussion above, other types of features may be used such as local binary pattern (LBP), patch symmetric patterns, transitional LBP patterns, center symmetric patterns, etc.

Figure 2:
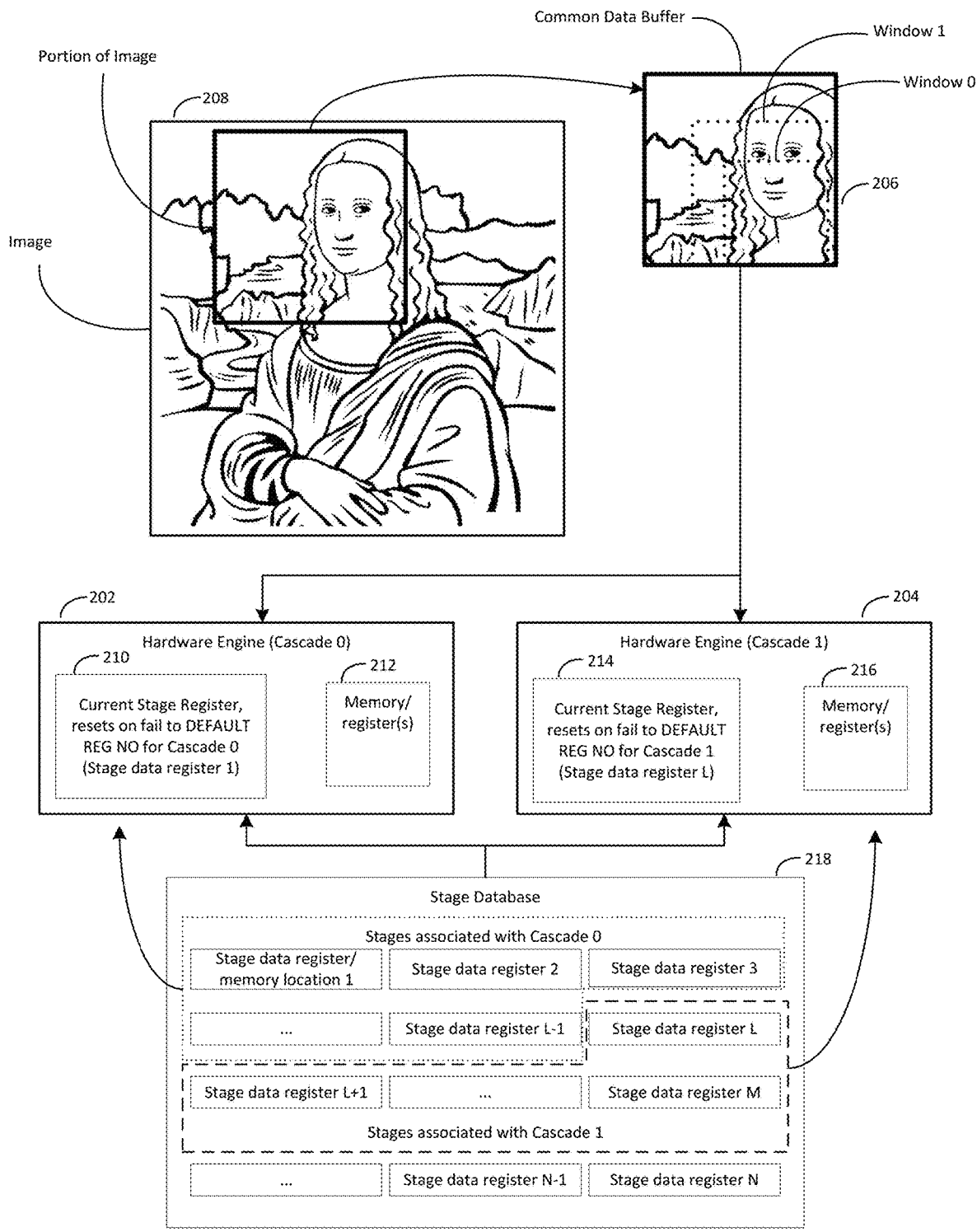
FIG. 2 depicts multiple hardware engines configured to implement multiple cascade classifiers, according to one embodiment of the present disclosure.

FIG. 2 depicts multiple hardware engines configured to implement multiple cascade classifiers, according to one embodiment of the present disclosure. The hardware engines shown are examples of components that may constitute a hardware-based classification apparatus according to various embodiments of the present disclosure. As shown in the figure, a first hardware engine 202 and second hardware engine 204 are configured to implement a first cascade classifier ("Cascade 0") and a second cascade classifier ("Cascade 1") by performing classification based on image data stored in a common image data buffer 206. In one embodiment, the common image data buffer 206 may store a portion of an image 208 that corresponds to an actual image captured by an image sensor, such as a camera. In another embodiment, the common image data buffer 206 may store a portion of an integral image, or an integral image of a portion of an image, such as image 208. Here, an integral image refers to an image representing a summed-area table used to efficiently generate the sum of pixel values in a rectangular subset of a rectangular image. For example, the values of the pixel at (x,y) in the integral image may be defined as:

$$I(x, y) = \sum_{\substack{x' \leq x \\ y' \leq y}} i(x', y'),$$

where i(x,y) is the value of the pixel at (x,y) in the original image.

The first hardware engine 202 and second hardware engine 204 may implement one or more stages within each of the two cascade classifiers in a variety of ways. In the embodiment shown in FIG. 2, the first hardware engine 202 contains a set of registers, including a current stage register 210 and memory register(s) 212 which keep track of data for the first cascade classifier, Cascade 0. The operation of the first cascade classifier and second cascade classifier is described in more detail in subsequent sections, e.g., in the context of FIG. 5. For example, each stage in the first cascade classifier may be given an index number, and the current stage register 210 may store a value that represents the index number of the "current stage" that is presently being evaluated in the first cascade classifier. Memory register(s) 212 may store values such as accumulation values that may be used or generated by the execution of the first cascade classifier as it executes through its stages. Similarly, the second hardware engine 204 contains a set of registers, including a current stage register 214 and memory register(s) 216 which keep track of data for the second cascade classifier, Cascade 1.

In this embodiment, the first hardware engine 202 and second hardware engine 204 may access a stage database 218 that stores data for each stage of the plurality of stages associated with each cascade classifier. As shown in the figure, for stages associated with the first cascade classifier, Cascade 0, the stage database 218 may include one or more data registers or memory locations for storing data for stages 1 through L−1. For stages associated with the second cascade classifier, Cascade 1, the stage database may include one or more data registers or memory location for storing data for stages L through M. The stage database 218 may store data for additional stages, such as data for additional stages through stage N−1 and stage N, e.g., to accommodate additional cascade classifiers. The data registers or memory locations may be used to store values such as flags, scores, thresholds, etc., to support the evaluation of the particular stage of the respective cascade classifier.

Figure 3:
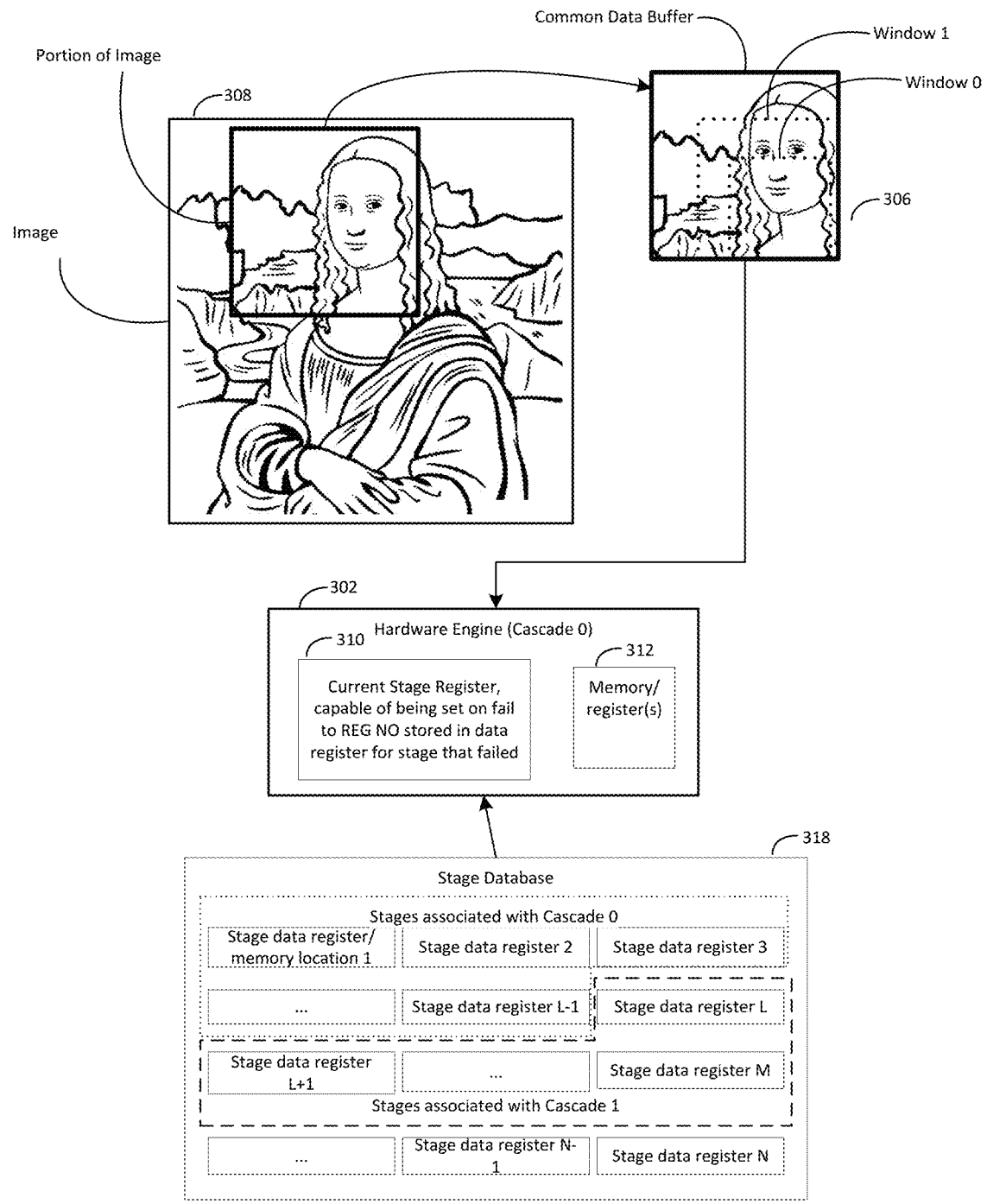
FIG. 3 depicts a single hardware engine configured to implement multiple cascade classifiers, according to another embodiment of the present disclosure.

FIG. 3 depicts a single hardware engine configured to implement multiple cascade classifiers, according to another embodiment of the present disclosure. The hardware engine shown is an example of a component that may constitute a hardware-based classification apparatus according to various embodiments of the present disclosure. Here, a single hardware engine 302 is configured to implement a first cascade classifier ("Cascade 0") and a second cascade classifier ("Cascade 1") by performing classification based on image data stored in a common image data buffer 306. Similar to the arrangement shown in FIG. 2, the common image data buffer 306 may store a portion of an image 308 that corresponds to an actual image captured by a sensor such as a camera, just as an example. In another embodiment, the common image data buffer 306 may store a portion of an integral image, or an integral image of a portion of an image, such as an image 308.

The single hardware engine 302 may implement one or more stages within each of two cascade classifiers in a variety of ways. In the embodiment shown in FIG. 3, the single hardware engine 302 contains a set of registers, including a current stage register 310 and memory register(s) 312 which keep track of data for the combined classifier that links two cascade classifiers, such as a first cascade classifier, Cascade 0, and a second cascade classifier, Cascade 1. The operation of such a combined classifier is described in more detail in subsequent sections, e.g., in the context of FIG. 6. Here, each stage in the combined cascade classifier may be given an index number, and the current stage register 310 may store a value that represents the index number of the "current stage" that is presently being evaluated in the combined cascade classifier. Memory register(s) 312 may store values such as accumulation values that may be used or generated by the execution of the combined cascade classifier as it executes through its stages. The stages of the cascade classifiers may be implemented in various ways. In one embodiment, stages may be implemented as hardware, e.g., in the form of specific registers or portions of memory that may be associated with index numbers. In other embodiments, stages may be implemented in software, e.g., as pointers or allocated memory locations which may be labeled using different names and/or indices.

According embodiments of the disclosure, a hardware engine may have access to memory to enable storing of stage-related data usable by the hardware engine across different cascades. For example, in the embodiment shown in FIG. 3, the single hardware engine 302 may access a stage database 318 that stores data for each stage of the plurality of stages associated with the combined cascade classifier. As shown in the figure, for stages associated with the first cascade classifier, Cascade 0, the stage database 318 may include one or more data registers or memory locations for storing data for stages 1 through L−1. For stages associated with the second cascade classifier, Cascade 1, the stage database may include one or more data registers or memory location for storing data for stages L through M. The stage database 318 may store data for additional stages, such as data for additional stages through stage N−1 and stage N, e.g., to accommodate additional cascade classifiers that may be linked in a similar manner, as part of the combined cascade classifier. The data registers or memory locations may be used to store values such as flags, scores, thresholds, etc., to support the evaluation of the particular stage of the respective cascade classifier.

Figure 4:
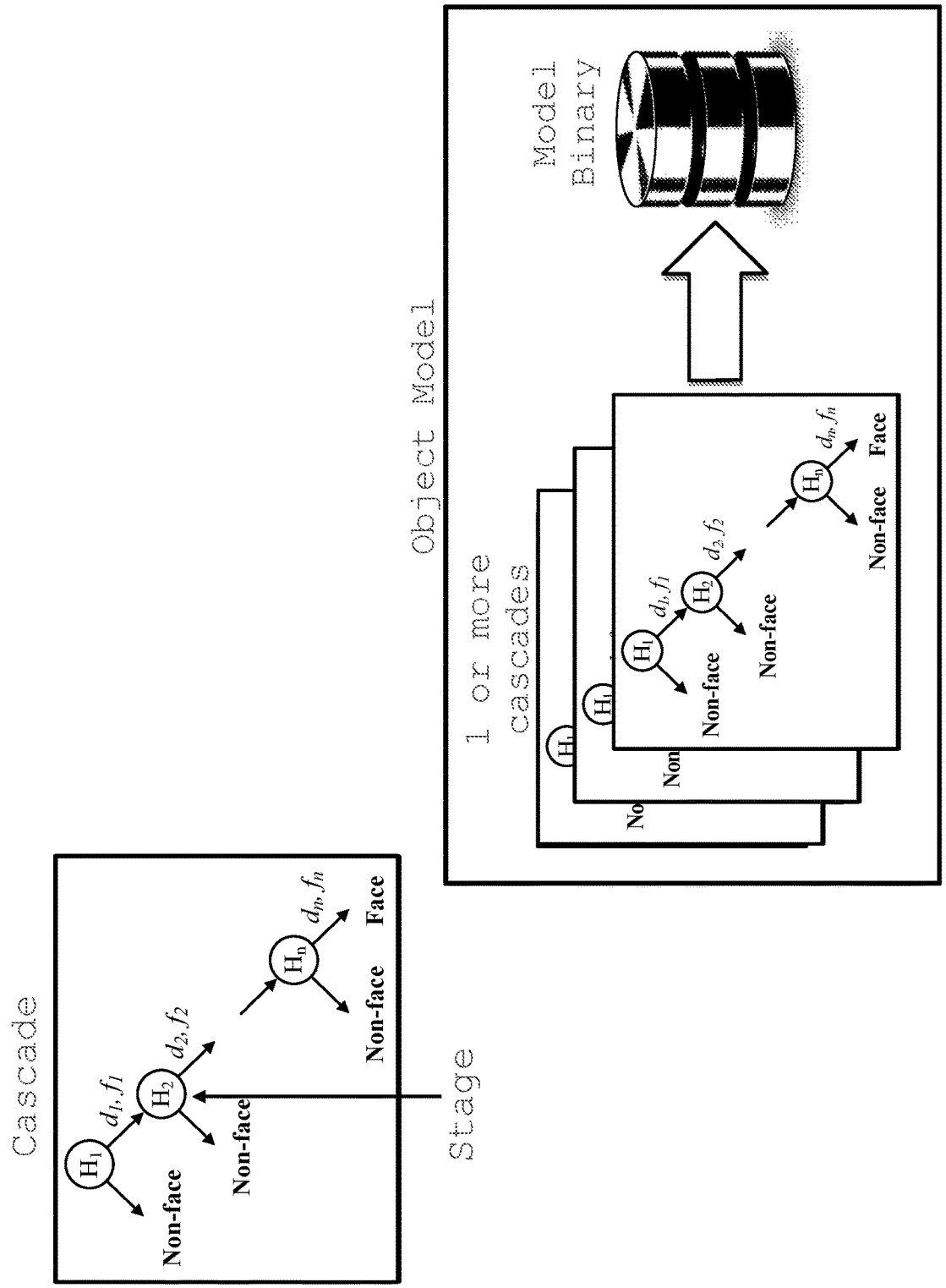
FIG. 4 shows the use of cascade classifiers in a hierarchical object model, according to one embodiment of the present disclosure.

FIG. 4 shows the use of cascade classifiers in a hierarchical object model, according to one embodiment of the present disclosure. Each cascade classifier may comprise one more stages. Here, the illustrative cascade classifier includes n stages, marked as $H_1, H_2, \ldots, H_n$. At each stage, based on the features calculated at that stage, a decision is made as to the detection or failure of detection of the target object. If detection is made (e.g., "Face"), the cascade classifier proceeds to the next stage. If no detection is made (e.g., "Non-face), the cascade classifier exits its routine and concludes that detection has failed, without proceeding to the next stage. As shown in the figure, one or more cascade classifiers may be constructed in this manner and used together to build an object model. The one or more cascade classifiers may be configured to detect the same object according to different parameters or different object classes.

Figure 5:
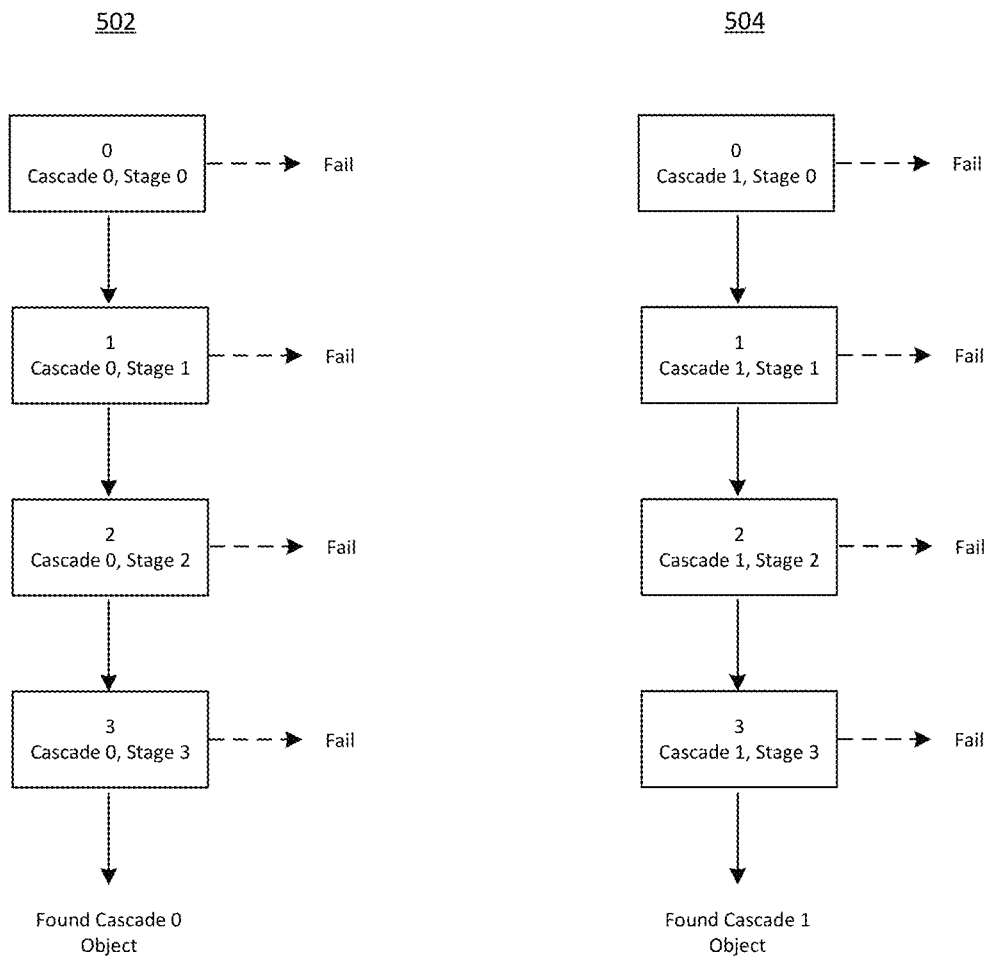
FIG. 5 illustrates two cascade classifiers operating independently.

FIG. 5 illustrates in further detail two cascade classifiers operating independently. A first cascade classifier 502 and a second cascade classifier 504 are depicted. In one embodiment, the first cascade classifier 502 performs object detection (e.g., detect a face) on a window of a first window size (e.g., window 0 in FIGS. 2 and 3), and the second cascade classifier 504 performs object detection (e.g., detect a face) on a window of a second window size (e.g., window 1 in FIGS. 2 and 3) different from the first window size. In another embodiment, the first cascade classifier 502 performs object detection of a first object class (e.g., face versus body), while the second cascade classifier 504 performs object detection of a second object class (e.g., humans versus cats) different from the first object class.

The first cascade classifier 502 is shown to include multiple stages, including stages 0, 1, 2, and 3. The second cascade classifier 504 is shown to include multiple stages as well, including stages 0, 1, 2, and 3. The first cascade classifier 502 and the second cascade classifier 504 may be implemented by use of one or more hardware engines, such as hardware engines 202 and 204 shown in FIG. 2 or single hardware engine 302 shown in FIG. 3. Each of the first cascade classifiers 502 and second cascade classifier 504 operates independently, in a cascaded manner. For example, in stage 0 of the first cascade classifier 502, certain features may be calculated and the resulting combined score for the features may be compared to a threshold. If the threshold is met or surpassed (as indicated by a solid arrow), indicating that detection at stage 0 is achieved, the first cascade classifier proceeds to stage 1. Otherwise, if the threshold is not met or surpassed (as indicated by the dashed arrow), indicating that detection at stage 0 is not achieved, the first cascade classifier 502 declares a "Fail" and exits without evaluating any subsequent stages. Subsequent stages, including stages 1, 2, and 3, operation in like fashion. Depending on the result at each stage, the first cascade classifier 502 either proceeds to a subsequent stage or declares a "Fail" and exists without evaluating any subsequent stages. The second cascade classifier 504 operations in a similar manner. Each cascade classifier is efficient in the sense that it can reject a sub-window of image data (such as window 0 shown in FIG. 2 and FIG. 3) early, without evaluating all of the stages in subsequent stages, if a particular stage fails to meet the threshold set for the features calculated for that stage.

According to conventional techniques, the hardware implementation of independent cascade classifiers, such as the first cascade classifier 502 and second cascade classifier 504 shown in FIG. 5, typically follows a "hard-wired" approach that forces the evaluation path after each stage, e.g., Stage 0, to either (1) proceed to the next stage, e.g., Stage 1, or (2) exit the cascade classifier. Such an approach is illustrated in the operation of the cascade classifiers shown in FIG. 5.

Figure 6:
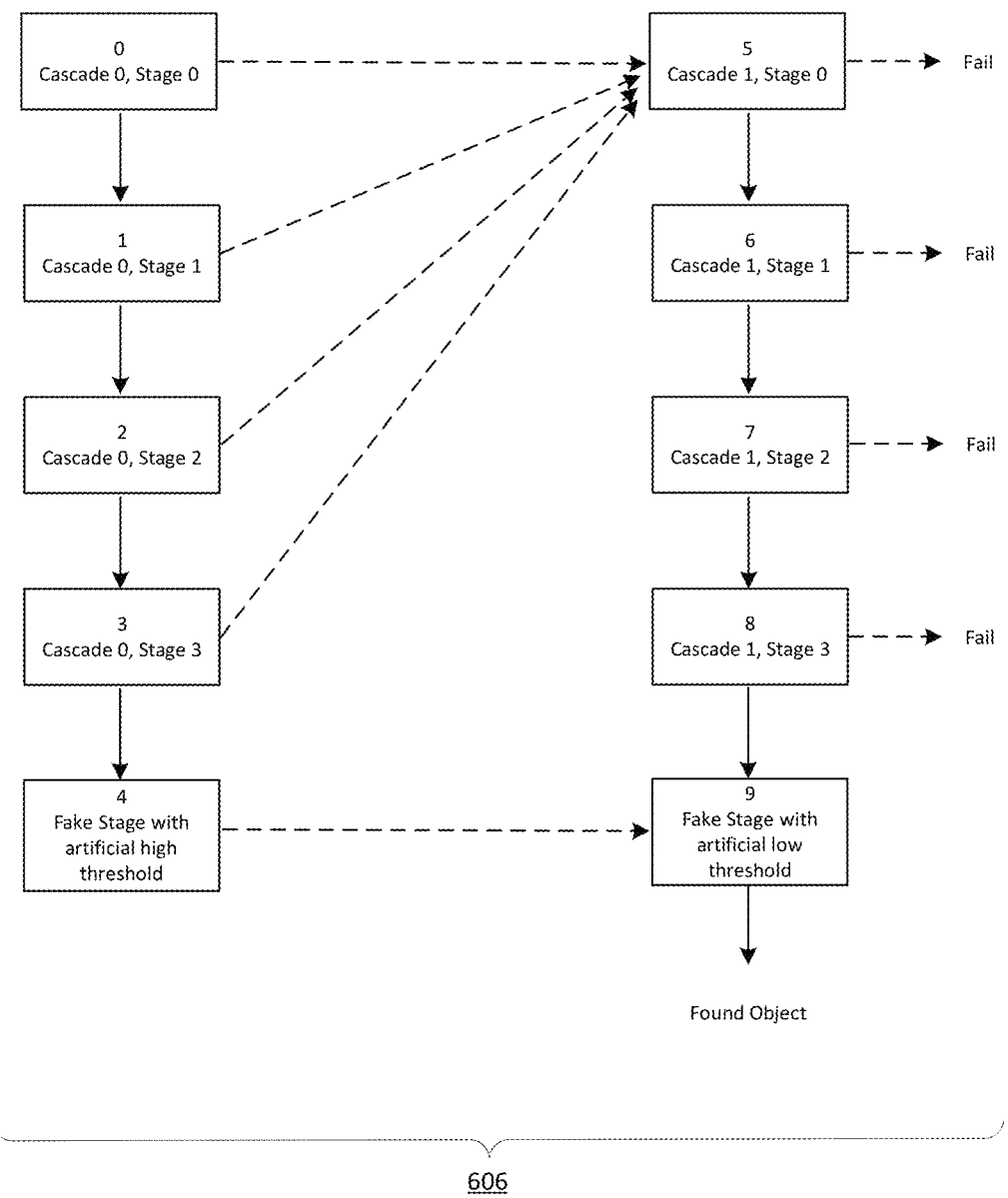
FIG. 6 illustrates a conditional branch operation from a first cascade classifier to a second cascade classifier, according to an embodiment of the present disclosure.

FIG. 6 illustrates a conditional branch operation from a first cascade classifier to a second cascade classifier, according to an embodiment of the present disclosure. As before, a first cascade classifier 602 and a second cascade classifier 604 are depicted. Similar to FIG. 5, the first cascade classifier 602 and second cascade classifier 604 shown in FIG. 6 may perform object detection on windows of different window sizes (e.g., windows 0 and 1 in FIGS. 2 and 3). In another embodiment, the first cascade classifier 602 performs object detection of a first object class (e.g., face versus body), while the second cascade classifier 604 performs object detection of a second object class (e.g., humans versus cats) different from the first object class.

FIG. 6 illustrates that the first cascade classifier 602 and second cascade classifier 604 may be implemented as a combined cascade classifier 606. In one embodiment, the combining of the two cascade classifiers is achieved through the use of a conditional branch operation introduced into the capability of the hardware resources associated with the cascade classifiers. Here, the conditional branch operation is used to link the first cascade classifier 602 to the second cascade classifier 604. For example, in stage 0 of the first cascade classifier 602, certain features may be calculated and the resulting combined score for the features compared to a threshold. If the threshold is met or surpassed (as indicated by a solid arrow), indicating that detection at stage 0 is achieved, the first cascade classifier proceeds to stage 1. This is similar to the operation shown in FIG. 5. However, if the threshold is not met or surpassed (as indicated by the dashed arrow), indicating that detection at stage 0 is not achieved, the first cascade classifier 602 declares a "Fail" and branches to stage 0 of the second cascade classifier 604. This contrasts with the logical flow shown in FIG. 5, where upon a "Fail" condition, the first cascade classifier simply exits. The other stages of the first cascade classifier 602 operation in a similar manner. That is, upon a "Fail" condition (as indicated by the dashed arrow), the first cascade classifier 602 does not exit but instead branches to stage 0 of the second cascade classifier 604. Although all stages of the first cascade classifier 602 are illustrated as branching to the same stage of the second cascade classifier 604 (hardware stage 5; cascade 1, stage 0) for ease of explanation, it is understood that, more generally, a fail at any given stage in first cascade classifier 602 could branch to any stage in the second cascade classifier 604. As such, the stage in second cascade classifier 604 to which a given stage in first cascade classifier 602 branches on fail could, in some implementations, depend upon the given stage in the first cascade classifier 602.

Thus, FIG. 6 presents an example of performing classification with a first cascade classifier based on image data stored in a common image data buffer and performing classification with a second cascade classifier based on the image data stored in the common image data buffer. Here, the classification performed by the second cascade classifier is different from the classification performed by the first cascade classifier. According to an embodiment, performing the classification with the first cascade classifier comprises (1) determining an outcome condition associated with evaluation of at least one stage of one or more stages of the first cascade classifier and (2) responsive to the outcome condition matching a pass condition, proceeding to a next stage of the one or more stages of the first cascade classifier. Responsive to the outcome condition matching a fail condition, the process may conditionally branch from the first cascade classifier to a stage of one or more stages of the second cascade classifier.

Figures 12A, 12B:
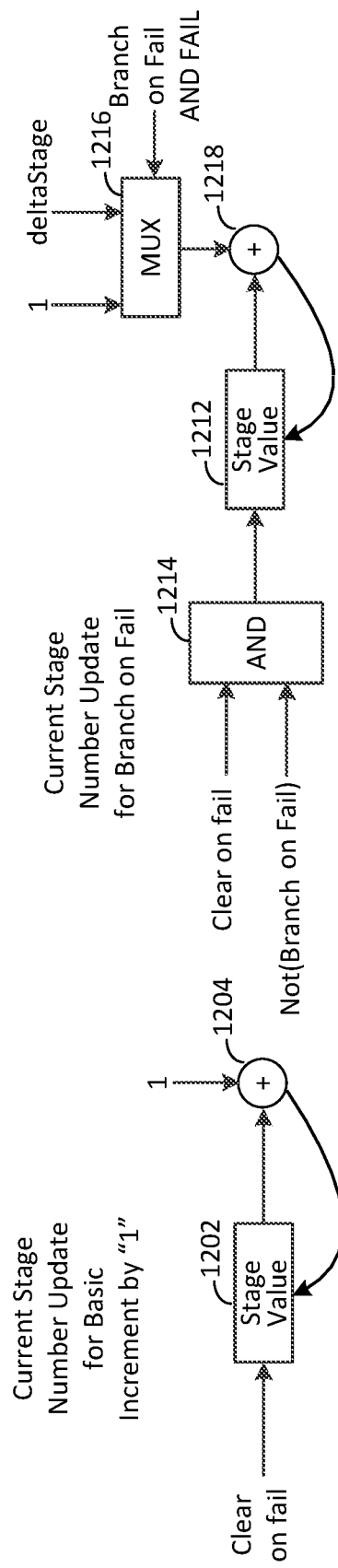
FIG. 12A is a low level hardware diagram of the registers and gates involved in the update of a current stage register used in a traditional cascade classifier.
FIG. 12B is a low level hardware diagram of the registers and gates involved in the update of a current stage register used in a cascade classifier capable of a branch-on-fail operation, according one embodiment of the disclosure.

FIG. 12B, discussed in subsequent sections, provide further details of an example of a hardware design to implement a conditional branch operation such as that depicted in FIG. 6.

Operation at each stage of the second cascade classifier 604 is similar to that of FIG. 5. That is, if the threshold is met or surpassed (as indicated by a solid arrow), indicating that detection at the stage is achieved, the second cascade classifier 604 proceeds to the next stage. If the threshold is not met or surpassed (as indicated by the dashed arrow), indicating that detection at the stage is not achieved, the second cascade classifier 604 declares a "Fail" and exits.

As shown in FIG. 6, the resulting combined cascade classifier 606 has hardware stages associated with unique hardware stage identifiers 0 through 9. Stages associated with hardware stage identifiers 0 through 3 in the combined cascade classifier 606 correspond to logical stages 0 through 3 of the first cascade classifier 602. Stages associated with hardware stage identifiers 5 through 8 in the combined cascade classifier 606 correspond to logical stages 0 through 3 of the second cascade classifier 604.

A benefit of the conditional branch capability to branch from one cascade classifier to another is design flexibility. Different cascade classifiers of different lengths may be implemented, and the design may change, without requiring a new hardware layout of the system. By making stage(s) where conditional branch occurs configurable, as well as making the branch increment configurable, the overall design of the system is freed from the inflexible nature of hard-wired cascade classifiers, in which stages and path between stages, once formed, are difficult to alter.

Furthermore, a modular design may be advantageously used to implement the stages of the cascade classifier(s), such as those shown in FIG. 6. The hardware associated with each stage may be similarly structured and contain similar capabilities. For example, each stage may be equipped to calculate one or more features, generate a combined score from the calculated features, compare the combined score to a threshold, perform a conditional branch (e.g., branch on fail), etc. The operation of each stage may be individually configurable, by supplying the stage with the particular control parameters specific to that stage, such as feature definitions, threshold value, branch increment value, etc. The modular nature of the stages of the first and second cascade classifiers allows the overall system to be highly configurable. Such a design may serve to provide additional flexibility, such that the same hardware can be re-configured to meet different or changing object detection needs.

The modular design of the stages may also allow different types of stages to be implemented using the same design. For example, a "Fake Stage" may be implemented using the same modular hardware resource of a standard stage. In the context of FIG. 6, such "Fake Stages" may be employed to effectuate a graceful exit in the event that the target object is found by either the first cascade classifier 602 or the second cascade classifier 604. More generally speaking, a "Fake Stage" may be used in different scenarios where the output is predetermined (e.g., always pass or fail). In the embodiment depicted in the figure, a face may be detected using either the first cascade classifier 602 (operating on Window 0) or the second cascade classifier 604 (operating on Window 1). Specifically, if stage 3 of the first cascade classifier 602 results in the threshold being met or surpassed (as indicated by a solid arrow), indicating that detection at stage 3 is achieved, the desired outcome is to reach the conclusion of "Found Object." To implement such a logical path, a "Fake Stage" may be configured with an artificially high threshold value, such that the result of the comparison operation is guaranteed to be "Fail" (as indicated by the dashed arrow). The branch increment may be set so that the "Branch on Fail" operation leads to the corresponding "Fake Stage" of the second cascade classifier 604. The "Fake Stage" of the second cascade classifier 604 may be configure with an artificially low threshold value, such that the threshold is guaranteed to be met or surpassed (as indicated by a solid arrow). Thus, detection of the target object by either the first cascade classifier 602 or the second cascade classifier 604 would lead to the same "Found Object" result. The exit upon detection of the target object is achieved without the need for any specialized stages. Instead, the "Fake Stages" and the real stages are all realized using the same modular stage design.

Figure 13B:
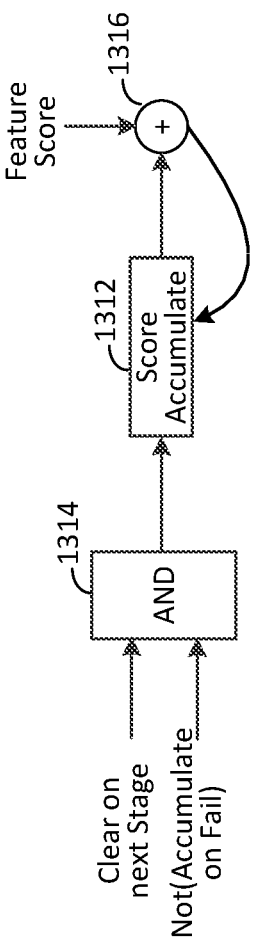
FIG. 13B is a low level hardware diagram of the registers and gates involved in an implementation of an accumulate-on-fail operation.
Figure 13A:
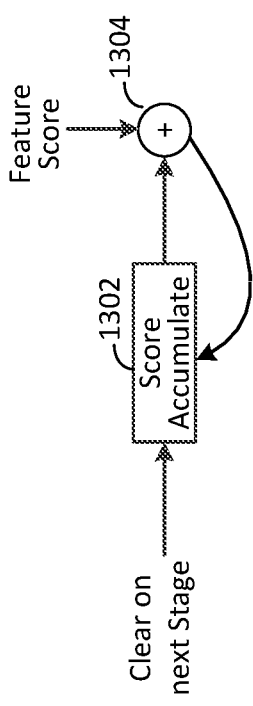
FIG. 13A is a low level hardware diagram of the registers and gates involved in one implementation of a basic accumulate operation.

According to one embodiment, a capability to accumulate a value across stages may be introduced to the cascade classifier to address various issues. One issue relates to the potential ambiguity of the path traveled upon reaching the "Found Object" result. For example, referring again to FIG. 6, the "Found Object" result may be reached by traversing a path "X" through the first cascade classifier 602 (e.g., stages associated with hardware stage identifiers 0, 1, 2, 3, 4, and 9) or a path "Y" through the second cascade classifier 604 (e.g., stages associated with hardware stage identifiers 0, 5, 6, 7, 8, and 9). Such an ambiguity may need to be resolved, for instance, if the first cascade classifier is configured to detect the target object in one sub-window (e.g., Window 0 in FIG. 2 or 3), and the second cascade classifier is configure to detect the target object in another sub-window (e.g., Window 1 in FIG. 2 or 3). It may be necessary to ascertain not merely the fact that the target object was detected, but which sub-window was the target object detected in. Thus, there may exist a need to resolve the ambiguity between path "X" vs. path "Y." To address this concern, a capability to accumulate a value across the combined cascade classifier 706 may be introduced. FIGS. 13A and 13B, discussed in subsequent sections, provide further details of examples of hardware designs to implement such a capability to accumulate a value across stages of the combined cascade classifier.

The accumulate capability can be used to resolved the ambiguity of traversed paths, by setting flag values in relevant stages that would indicate traversal through the particular stage. Just as an example, in FIG. 6, the ambiguity between path "X" through the first cascade classifier 602 (e.g., stages associated with hardware stage identifiers 0, 1, 2, 3, 4, and 9) and path "Y" through the second cascade classifier 604 (e.g., stages associated with hardware stage identifiers 0, 5, 6, 7, 8, and 9) may be resolved by detecting whether a flag set by the stage associated with hardware stage identifier 3 is present in the accumulated value. The accumulated value for the combined cascade classifier 606 may be stored, e.g., as a 32-bit unsigned integer, in a particular "accumulate" register (not shown in FIG. 6). The accumulated value may be reset upon entering the combined cascade classifier 606. At each stage, the stage may add a number to the value stored in the "accumulate" register and write the resulting sum back into the "accumulate register." In this simple example, all of the stages except the stage associated with hardware stage identifier 3 would add "0" to the accumulated value. By contrast, the stage associated with hardware stage identifier 3 would add a nominal value, say "1000" to the accumulated value. Upon reaching the "Found Object" result, the ambiguity between path "X" and "Y" may be resolved by simply inspecting the value in the "accumulate" register. An accumulate value of "1000" in the register would indicate that the combined cascade classifier 606 passed through the stage associated with hardware stage identifier 3, and the "X" path was traversed. An accumulated value of "0" would indicate that the combined cascade classifier 606 did not passed through the stage associated with hardware stage identifier 3, and the "Y" path was traversed. Here, the accumulated value is used as a "flag" in the general sense that it serves as a status indicator. The particular values used can be different (e.g., value other than "1000"). Also the operation does not necessarily have to be a pure addition operation. Just as an example, a modulo-n operation such as an modulo-2 sum may be used—e.g., 1 mod 2 may indicate a path through the "X" path, and 0 mod 2 may indicate a path through the "Y" path.

Figure 7:
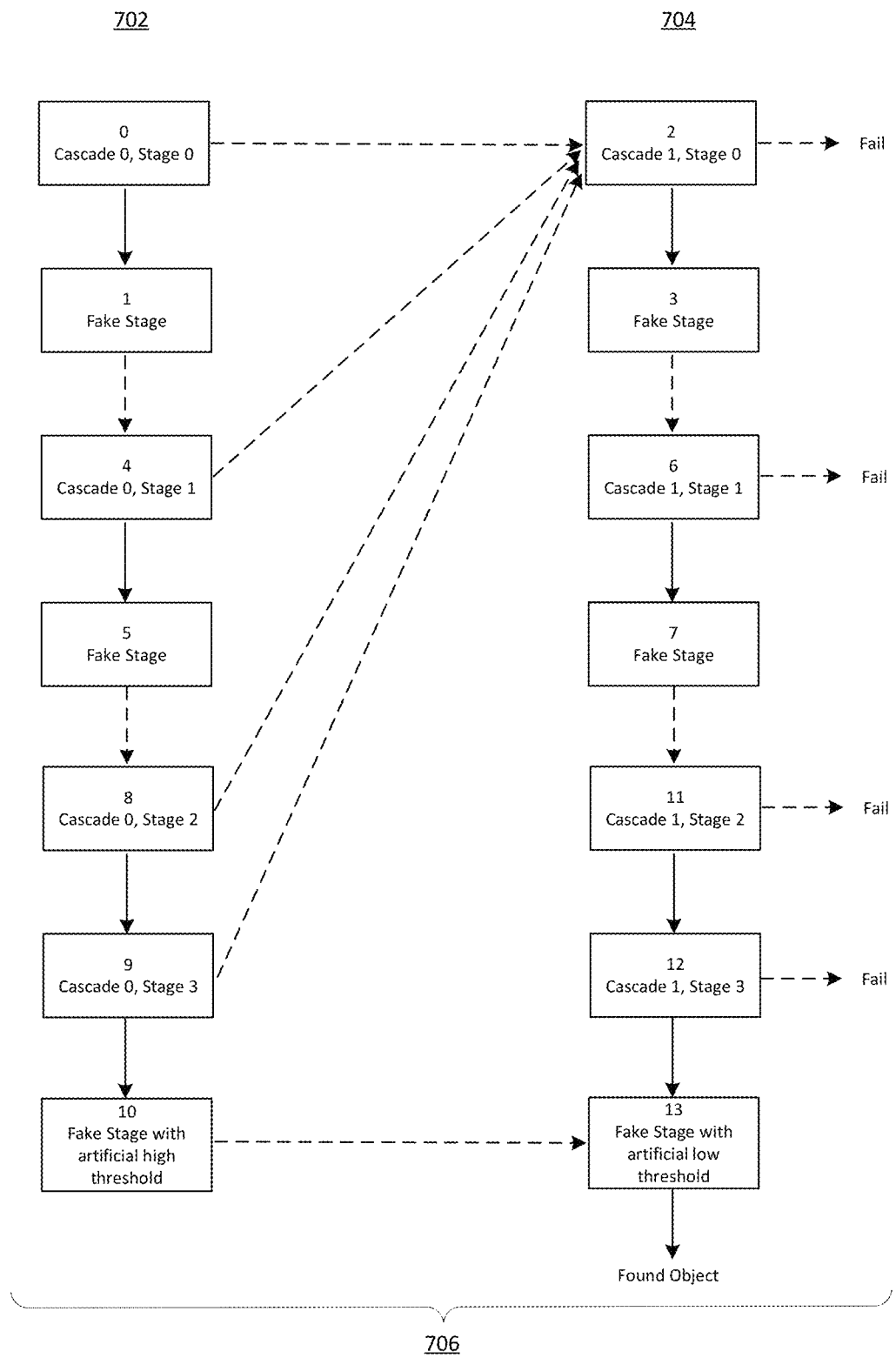
FIG. 7 illustrates the assignment of hardware stage identifiers within a common range of values to similar logical stages of a first cascade classifier and a second cascade classifier.

FIG. 7 illustrates the assignment of hardware stage identifiers within a common range of values to similar logical stages of a first cascade classifier and a second cascade classifier. As shown in the figure, various conditional branch operations may link a first cascade classifier 702 to a second cascade classifier 704, to form a combined cascade classifier 706. Here, hardware stages of the combined cascade classifier 706 that correspond to similar logical stages of the first cascade classifier 702 and the second cascade classifier 704 are assigned hardware stage identifiers within a common range of values.

For example, hardware stage identifiers 0, 1, 2, and 3 represent a common range of "low" values, and they are assigned to logical stage 0 of the first cascade classifier 702, a logical "Fake Stage" of the first cascade classifier 702, logical stage 0 of the second cascade classifier 704, and a "Fake Stage" of the second cascade classifier 704, respectively. Hardware stage identifiers 4, 5, 6, and 7 represent a common range of "medium" values, and they are assigned to logical stage 1 of the first cascade classifier 702, a logical "Fake Stage" of the first cascade classifier 702, logical stage 1 of the second cascade classifier 704, and a "Fake Stage" of the second cascade classifier 704, respectively. Finally, hardware stage identifiers 8, 9, 10, 11, 12, and 13 represent a common range of "high" values, and they are assigned to logical stage 2 of the first cascade classifier 702, logical stage 3 of the first cascade classifier 702, a logical "Fake Stage" of the first cascade classifier 702, logical stage 2 of the second cascade classifier 704, logical stage 3 of the second cascade classifier 704, and a "Fake Stage" of the second cascade classifier 704, respectively. Hence, hardware stages implementing logical stages of the first cascade classifier and similar logical stages of the second cascade classifier are assigned hardware stage identifiers within a common range of values. As such, both first cascade classifier 702 and second cascade classifier 704 have similar logical stages, both have a stage 0. The hardware stages implementing these logical stages are both in a "low" range of values, namely 0 and 2.

By assigning hardware stages corresponding to similar logical stages of different cascade classifiers to hardware stage identifiers within a common range of values, the hardware stage identifier becomes a useful indicator of the depth to which object detection reached within the logical cascade classifiers. By recording the highest hardware stage identifier reached over the course of an object detection, an indicator of the strength of the detection may be obtained. If object detection did not reach very deep within the logical cascade classifiers, as indicated the highest recorded hardware identifier being a low value, it may be concluded that there was weak detection of the target object. On the other hand, if object detection reached deep within the logical cascade of classifiers, as indicated by the highest recorded hardware identifier being a high value, it may be concluded that there was a strong detection of the target object. The highest hardware stage identifier recorded, for example, may be the highest stage identifier recorded during an execution of the hardware engine, e.g., during an execution of the first cascade classifier and the second cascade classifier. It is during such an execution that an object may be detected. Hence, the hardware engine can be configured to record a value representing a highest hardware stage identifier reached during an execution of the hardware engine.

While the first cascade classifier and the second cascade classifier are shown here and in previous figures as having an equal number of stages, in other embodiments, the number of stages present in different cascade classifiers may be different. Also, while examples depicting two cascade classifiers are described for ease of illustration, the present disclosure encompasses embodiments that implement more than two cascade classifiers.

Figure 8:
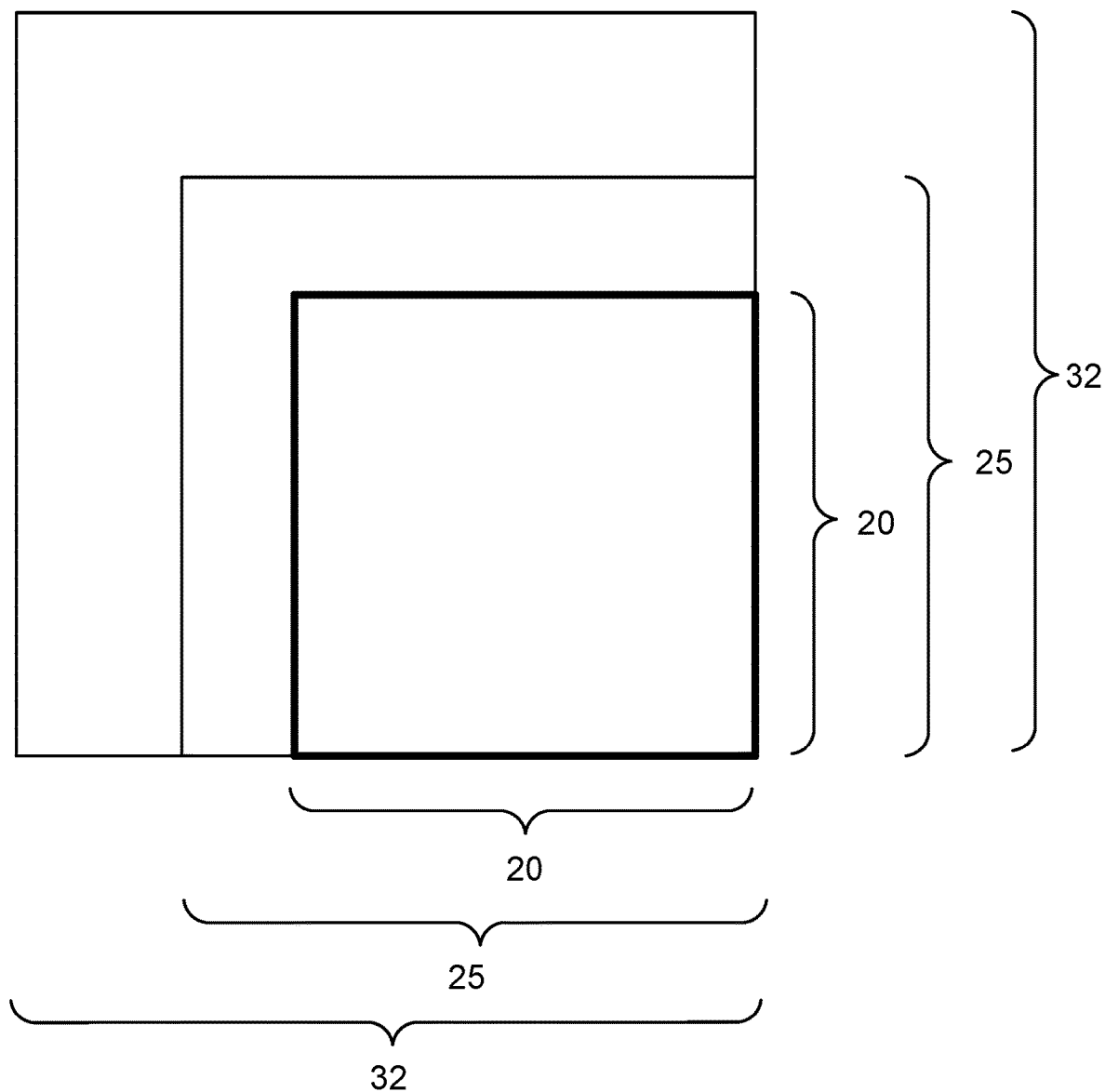
FIG. 8 shows the selection of sub-windows based on edge alignment, according to one embodiment of the disclosure.

FIG. 8 shows the selection of sub-windows based on edge alignment, according to one embodiment of the disclosure. Typically, an object detector such as each of the cascade classifiers disclosed herein is used to scan across an image (e.g., image 208 in FIG. 2) at multiple scales and locations. One way to scale the detector is by implementing differently sized cascade classifiers that operate on sub-windows of different sizes. For example, FIG. 8 shows three different sizes of sub-windows: 20 pixels by 20 pixels (20×20), 25 pixels by 25 pixels (25×25), and 32 pixels by 32 pixels (32×32). In this embodiment, each successively smaller window is determined by selecting a sub-portion of the present window based on edge alignment—i.e., alignment along two adjacent edges. As mentioned previously, the image data contained in each sub-window used may be captured image data, a portion of an integral image, or an integral image of a portion of image.

Figure 9:
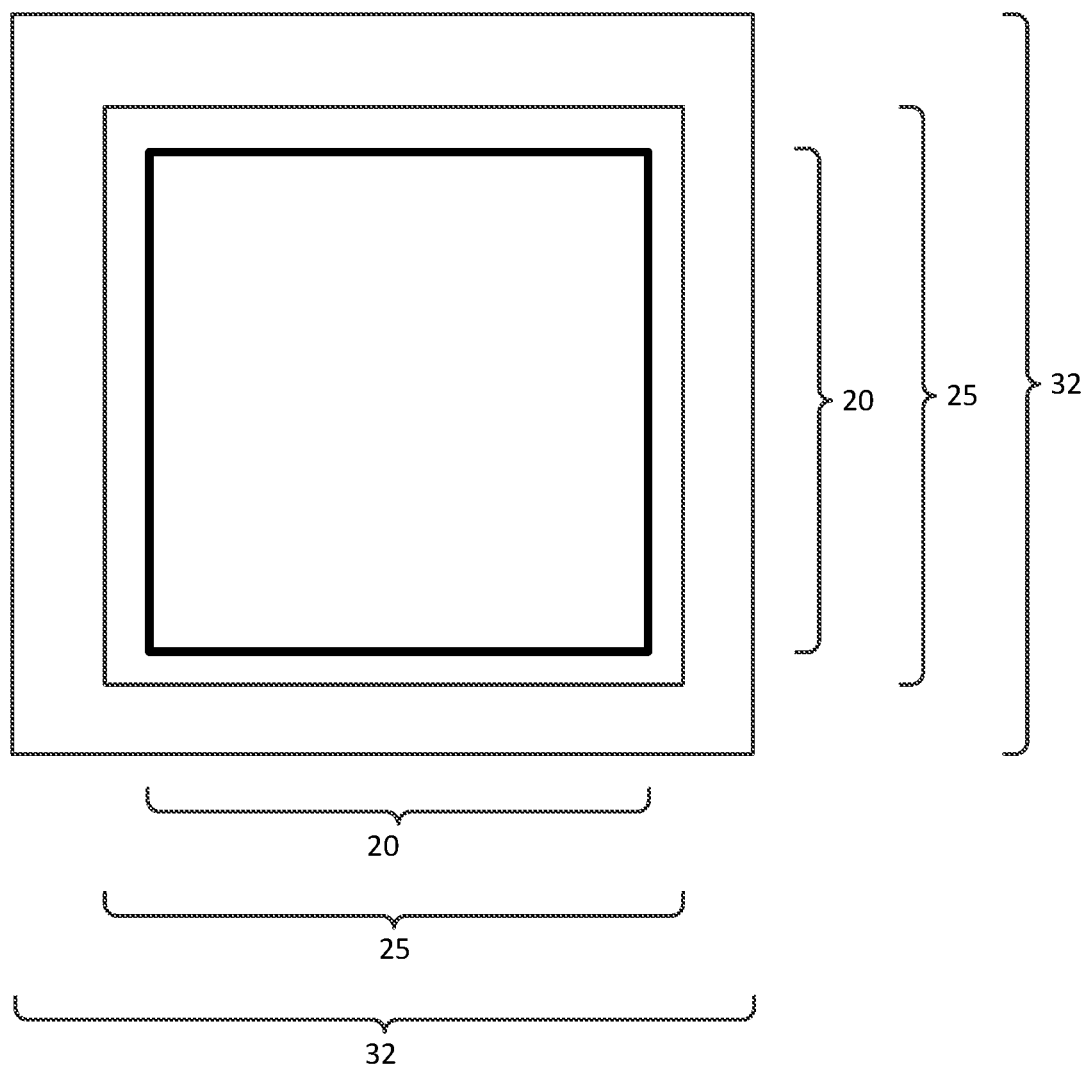
FIG. 9 shows the selection of sub-windows based on center alignment, according to another embodiment of the disclosure.

FIG. 9 shows the selection of sub-windows based on center alignment, according to another embodiment of the disclosure. Once again, the figure shows three different sizes of sub-windows: 20 pixels by 20 pixels (20×20), 25 pixels by 25 pixels (25×25), and 32 pixels by 32 pixels (32×32). In this embodiment, each successively smaller window is determined by selecting a sub-portion of the present window based on center alignment. That is, each successively smaller sub-window is centered on the previous, larger sub-window.

Figure 10:
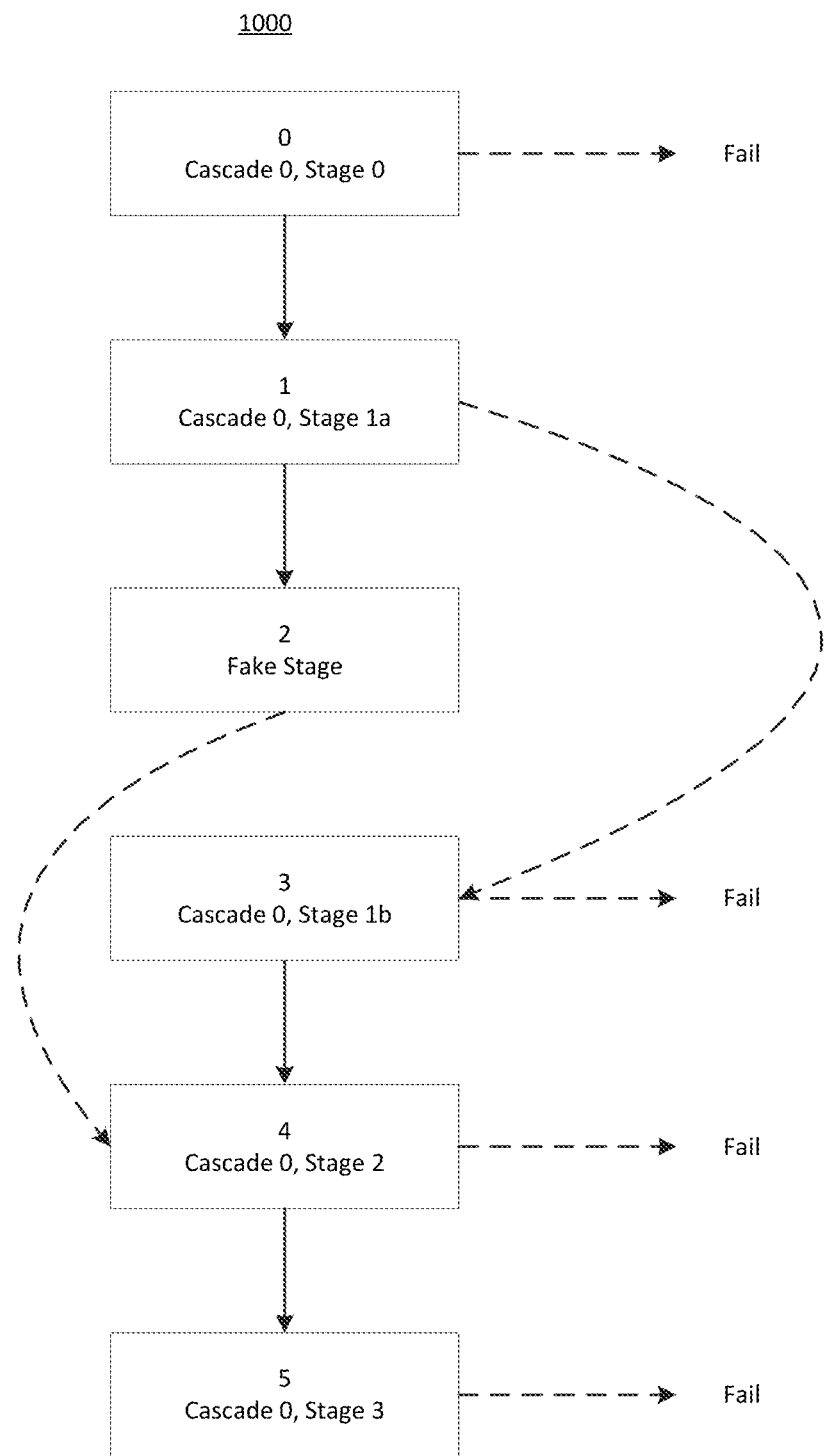
FIG. 10 illustrates an "early pass" operation performed over stages of a cascade classifier, according to an embodiment of the present disclosure.

FIG. 10 illustrates an "early pass" operation performed over stages of a cascade classifier, according to an embodiment of the present disclosure. As shown in FIG. 10, a cascade classifier 1000 comprises a number of stages. Here, cascade classifier 1000 is described as implementing a logical cascade classifier ("Cascade 0") which contains logical stages 0, 1*a*, 1*b*, 2, and 3. Cascade classifier 1000 may be built using hardware stages, labeled with hardware stage identifiers 0, 1, 2, 3, 4, and 5. For ease of explanation, the discussion of FIG. 10 below refers to logical stages 0, 1*a*, 1*b*, 2, and 3. It should be understood that these stages correspond to hardware stages 0, 1, 3, 4, and 5, respectively.

Generally speaking, the "early pass" operation allows for one or more features to be bypassed if their evaluation is deemed unnecessary, in order to improve efficiency. For example, take the case of a logical stage ("stage 1"—not shown in FIG. 10) that contains 10 features. If the first three features are particularly important, and 90% of images (or sub-windows) would pass stage 1 if they passed these three features, the three features may be placed in a separate stage, i.e., logical stage 1*a*. The rest of the seven features may be placed in another stage, i.e., logical stage 1*b*. If a particular sub-window passes an early pass threshold set with respect to the three features, i.e., passes logical stage 1*a*, calculating the other seven features may be avoided. That is, logical stage 1*b* may be bypassed. Doing so would improve the efficiency of the cascade classifier. This is depicted in FIG. 10. At logical stage 1*a*, if the early pass threshold is met (as indicated by a solid arrow, indicating an early pass condition), indicating that detection at this stage is achieved, logical stage 1*b* is bypassed (hence, evaluation of logical stage 1*b* is bypassed), and execution proceeds to logical stage 2. As shown in the figure, the bypass routine may be implemented using a "Fake Stage" (hardware stage index "2"), which may be configured with a threshold that guarantees a "branch on fail" outcome (as indicated by a dashed arrow), which leads to logical stage 2.

On the other hand, at logical stage 1*a*, if the sub-window does not pass the threshold set with respect to the three features, i.e., fails to pass the stage, it may be necessary to calculate the other seven features. Hence, if the early pass threshold at logical stage 1*a* is not met (continue evaluation condition), the stage fails (as indicated by a dashed arrow), and logical stage 1*b* is evaluated, i.e., evaluation of stage 1 continues by evaluating stage 1*b*. At this particular juncture, evaluation of logical stage 1*b* may involve all ten features. In a traditional cascade classifier design, all ten features would be calculated, including the three features that had previously been calculated in logical stage 1*a*. According to an embodiment of the present disclosure, a capability to accumulate a numeric value across stages may be employed to avoid such re-calculation.

A capability to accumulate a value across stages of a cascade classifier may involve, for example, a hardware engine configurable to (a) access a value indicative of whether to accumulate, (b) responsive to the value indicative of whether to accumulate meeting a continue evaluation condition, (i) access a first numeric value obtained from evaluation of the first stage, e.g., logical stage 1*a*, of the cascade classifier, (ii) accumulate the first numeric value with a second numeric value obtained from evaluation of the second stage, e.g., logical stage 1*b*, of the cascade classifier to generate an accumulated value, and (iii) utilize the accumulated value to determine an outcome for the second stage of the cascade classifier. In this example, the value indicative of whether to accumulate is the first numeric value obtained from evaluation of three features in the first stage of the cascade classifier, e.g., logical stage 1*a*.

Referring back to FIG. 10, logical stage 1*a* may utilize the accumulate capability to pass the value or score obtained from calculating its three features to logical stage 1*b*. Logical stage 1*b* may then use the accumulate feature to add the score from logical stage 1*a* to the score generated from calculating the remaining seven features. The result is an accumulated score that reflects calculation of all ten features present in logical stages 1*a* and 1*b*. This can be achieved without performing re-calculation of the first three features.

The accumulated score may then be evaluated against a threshold at logical stage 1b. As shown in FIG. 10, if the threshold at logical stage 1b is not met (as indicated by a dashed arrow), the cascade classifier exits with the "fail" outcome. If the threshold at logical stage 1b is met (as indicated by a solid arrow), the cascade classifier proceeds to logical stage 2, the same place where logical stage 1a was directed upon meeting the "early pass" condition for bypassing logical stage 1b.

Figure 11:
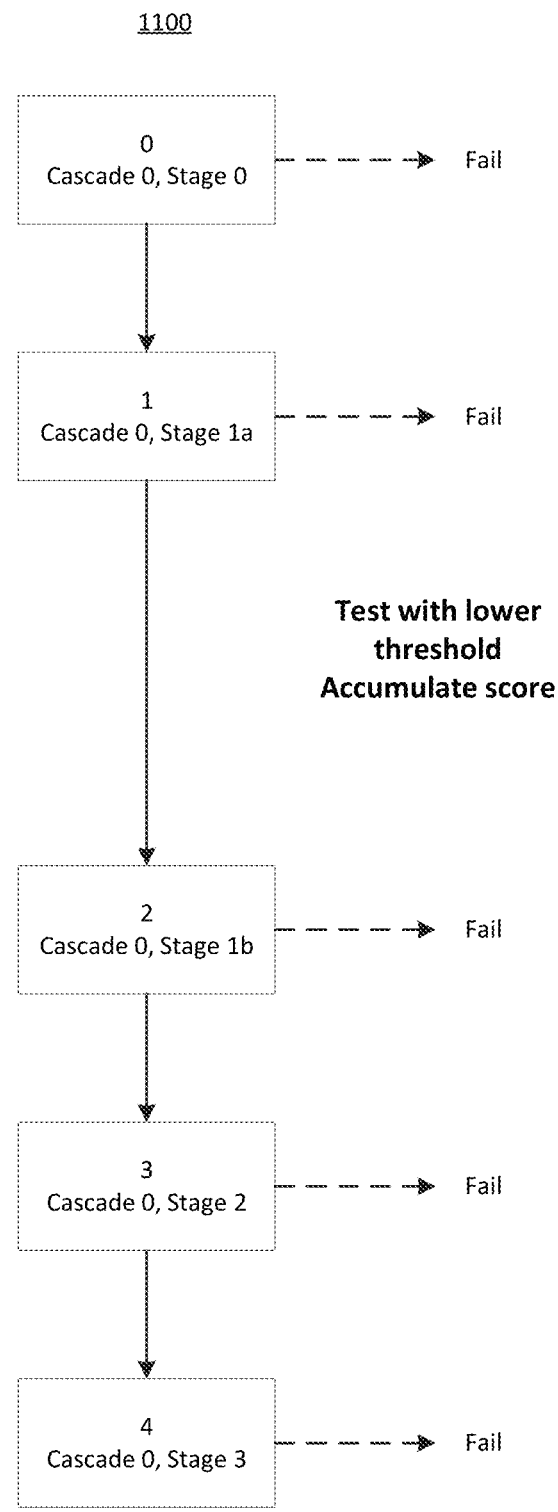
FIG. 11 illustrates an "early fail" operation performed over stages of a cascade classifier, according to an embodiment of the present disclosure.

FIG. 11 illustrates an "early fail" operation performed over stages of a cascade classifier, according to an embodiment of the present disclosure. As shown in FIG. 11, a cascade classifier 1100 comprises a number of stages. Here, cascade classifier 1100 is described as implementing a logical cascade classifier ("Cascade 0") which contains logical stages 0, 1a, 1b, 2, and 3. Cascade classifier 1100 may be built using hardware stages, labeled with hardware stage identifiers 0, 1, 2, 3, and 4. It should be understood that logical stages 0, 1a, 1b, 2, and 3 correspond to hardware stages 0, 1, 3, and 4, respectively.

Generally speaking, the "early fail" operation allows for early exit of the cascade classifier. For example, take the case of a logical stage ("stage 1"—not shown in FIG. 11) that contains 10 features. If not passing any of the first three features means there is no chance that the stage 1 can be passed, then the three features may be placed into a separate stage, i.e., logical stage 1a. The rest of the seven features may be placed in another stage, i.e., logical stage 1b. Logical stage 1a may test whether any of the first three features passed. For example, each of the first three features may be assigned a score of 100. Each of the remaining seven features may be assigned a score of 20. The threshold (for example an early-fail-avoid threshold) for logical stage 1a may be set at 100. Thus, if none of the first three features passes—i.e., logical stage 1a fails to meets its early-fail-avoid threshold of 100 (as indicated by a dashed arrow), the cascade classifier performs the "early fail" operation to reach a failure-to-detect outcome and exists. On the other hand, if one or more of the first three features passes (a continue evaluation condition)—i.e., the logical stage 1a meets its early-fail-avoid threshold of 100 (as indicated by the solid arrow), the cascade classifier moves to logical stage 1b (evaluation of stage 1 continues at stage 1b). At this juncture, evaluation of logical stage 1b may involve all ten features. In a traditional cascade classifier, all ten features would be calculated, including the three features that had previously been calculated in logical stage 1a. According to an embodiment of the present disclosure, a capability to accumulate a numeric value across stages may be employed to avoid such re-calculation.

As mentioned earlier, a capability to accumulate a value across stages of a cascade classifier may involve, for example, a hardware engine configurable to (a) access a first numeric value obtained from evaluation of the first stage of the cascade classifier, (b) accumulate the first numeric value with a second numeric value obtained from evaluation of the second stage of the cascade classifier to generate an accumulated value, and (c) utilize the accumulated value to determine an outcome for the second stage of the cascade classifier.

Referring back to FIG. 11, logical stage 1a may utilize the accumulate capability to pass the value or score obtained from calculating the three features to logical stage 1b. Logical stage 1b may then use the accumulate capability to add the score from logical stage 1a to the score generated from calculating the remaining seven features. The result is an accumulated score that reflects calculation of all ten features present in logical stages 1a and 1b, without re-calculating the first three features (thereby saving time, power, etc.). The accumulated score may then be evaluated against a threshold at logical stage 1b. As shown in FIG. 11, if the threshold at logical stage 1b is not met (as indicated by a dashed arrow), the cascade classifier exits with the "Fail" outcome. If the threshold at logical stage 1b is met (as indicated by a solid arrow), the cascade classifier proceeds to logical stage 2.

FIG. 12A is a low level hardware diagram of the registers and gates involved in the update of a current stage register used in a traditional cascade classifier. The components shown in FIGS. 12A and/or 12B may be part of a hardware-based classification apparatus according to various embodiments of the present disclosure. The design shown in FIG. 12A includes a register 1202 for storing an integer identifying the stage number of the current stage being evaluated in the cascade classifier, as well as an adder 1204 for adding a increment value of "1" to the current stage number. The output of the adder 1204 is fed back to the register 1202, so that the result of the addition operation can be written back to register 1202. This design may be appropriate for a traditional cascade classifier that always increments the stage number by "1" and may not be suitable for a cascade classifier capable of branching or other operations that require the current stage number to be incremented by a value other than "1." The "Clear on Fail" signal serves as a reset for clearing the current stage number to a default value, e.g., "0." The reset may be employed, for example, upon the initiation of a cascade classifier.

FIG. 12B is a low level hardware diagram of the registers and gates involved in the update of a current stage register used in a cascade classifier capable of a branch-on-fail operation, according to one embodiment of the disclosure. As shown, the design includes a register 1212 for storing an integer identifying the current stage number. An example of register 1212 may be the current stage register 310 found in the hardware engine 302 shown in FIG. 3. The design further includes an AND gate 1214, a multiplexer 1216, and an adder 1218. A "Clear on Fail" signal and a Not("Branch on Fail") signal are provided as inputs to the AND gate 1214. As discussed, the "Clear on Fail" signal may serve as a reset for clearing the current stage number to a default value, e.g., "0." Here, the current stage number may only be allowed to be reset if no branch on fail operation is in progress. An increment value of "1" and a value of "deltaStage" are provided as alternative inputs to the multiplexer 1216. A signal represented by "Branch on Fail" AND "FAIL" is provided as the selector input to the multiplexer 1216. Thus, if the current stage is a "Branch on Fail" branch, and the output condition of the stage is "FAIL," then the appropriate branch increment value, as represented by "deltaStage," is selected by the multiplexer 1216. Otherwise, the value of "1" is selected by the multiplexer 1216. The output of the multiplexer 1216 is provided as one of the inputs to the adder 1218. The other input of the adder 1218 comes from the output of the current stage register 1212. Adder 1218 adds either the value "1" or the "deltaStage" increment value to the current stage number found in register 1212 and writes the result of the addition operation back to register 1212. Thus, the current stage number is updated to accommodate a branch on fail operation, if one is in effect.

FIG. 13A is a low level hardware diagram of the registers and gates involved in one implementation of a basic accumulate operation. The components shown in FIGS. 13A and/or 13B may be part of a hardware-based classification apparatus according to various embodiments of the present disclosure. As shown in FIG. 13A, the design includes a register 1302 and an adder 1304. A "Clear on Next Stage" signal may serve as a reset for clearing the accumulated score to a default value, e.g., "0" when needed. The adder 1304 adds the "Feature Score" obtained from evaluation of the current stage to the accumulated score found in the register 1302, and the result of the addition is stored back to the register 1302. In this manner, the score stored in the register 1302 may be accumulated over multiple stages.

FIG. 13B is a low-level hardware diagram of the registers and gates involved in an implementation of an accumulate-on-fail operation. As shown, the design includes a register 1312, an AND gate 1314, and an adder 1316. The "Clear on Next" signal is logically AND'ed with a signal representing NOT ("Accumulate on Fail"), and the result is provided as a reset signal for clearing the accumulated score to a default value, e.g., "0" when needed. Thus, when "Accumulate on Fail" is active, the register 1312 is kept from being reset, and the score is accumulated. Similar as above, the adder 1316 adds the "Feature Score" obtained from evaluation of the current stage to the accumulated score found in the register 1312, and the result of the addition is stored back to the register 1312. In this manner, the score stored in the register 1312 may be accumulated over multiple stages.

Figure 14A:
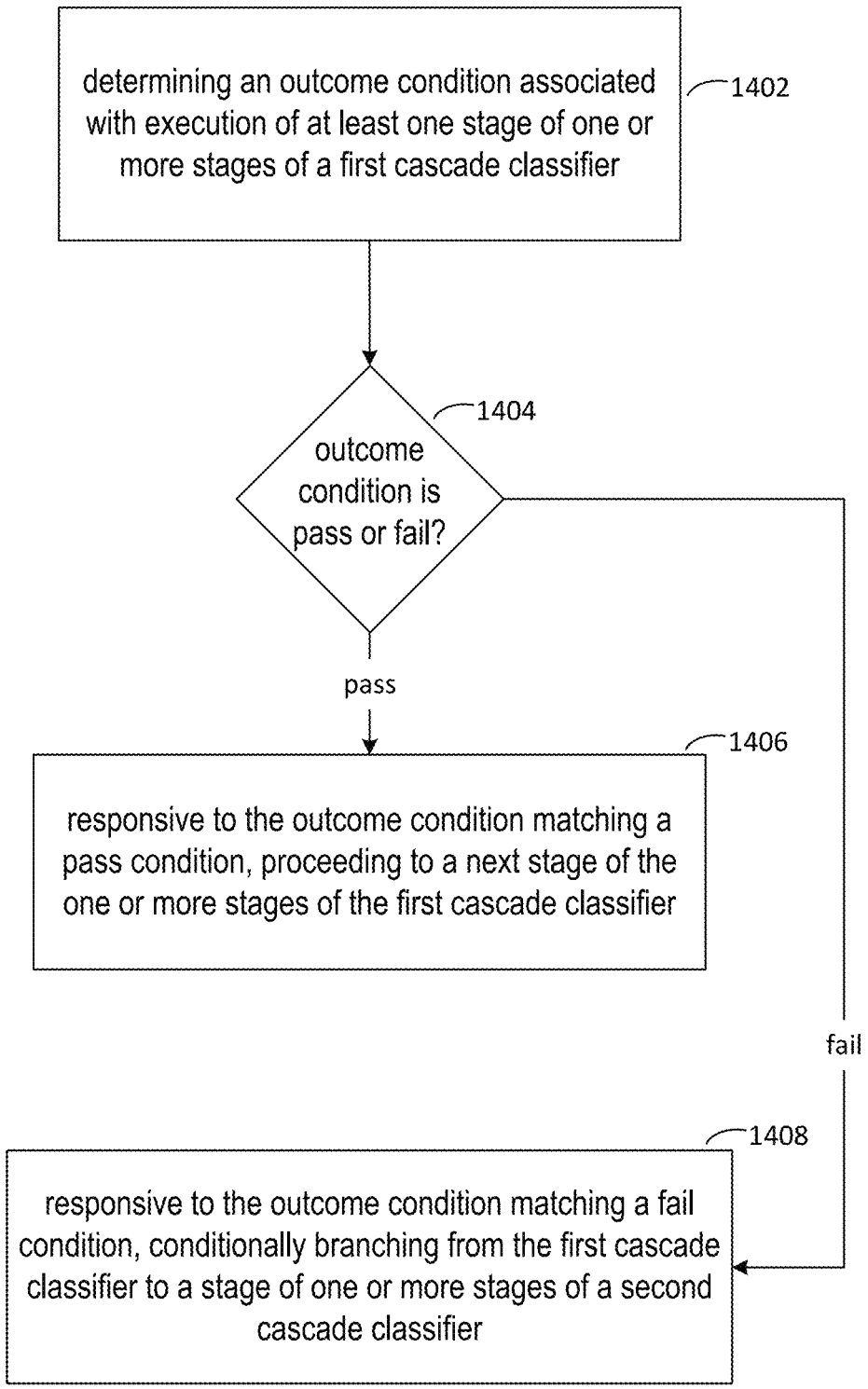
FIG. 14A is a flow chart showing a conditional branch sequence from a first cascade classifier to a second cascade classifier, according to an embodiment of the present disclosure.

FIG. 14A is a flow chart showing a conditional branch sequence 1400 from a first cascade classifier to a second cascade classifier, according to an embodiment of the present disclosure. As shown in FIG. 14A, the sequence 1400 comprises illustrative steps 1402, 1404, 1406, and 1408. At step 1402, the system determines an outcome condition associated with execution or evaluation of at least one stage of one or more stages of a first cascade classifier. At a step 1404, the system evaluates whether the outcome condition matches a pass condition or a fail condition. Means for performing steps 1402 and 1404 can, but not necessarily, include, for example, hardware engine 202 in FIG. 2, hardware engine 302 in FIG. 3, processing unit(s) 1710 in FIG. 17, and/or digital signal processing unit (DSP) 1720 in FIG. 17. In step 1406, responsive to the outcome condition matching a pass condition, the system proceeds to a next stage of the one or more stages of the first cascade classifier. In step 1408, responsive to the outcome condition matching a fail condition, the system conditionally branches from the first cascade classifier to a stage of one or more stages of a second cascade classifier. Means for performing steps 1406 and 1408 can, but not necessarily, include, for example, lower level hardware components such as the circuitry shown in FIG. 12B, hardware engine 202 in FIG. 2, hardware engine 302 in FIG. 3, processing unit(s) 1710 in FIG. 17, and/or digital signal processing unit (DSP) 1720 in FIG. 17. According to an embodiment, the first cascade classifier and the second cascade classifier may be configured to perform classification based on image data stored in a common image data buffer. Also, the first cascade classifier may be configured to perform classification different from a classification performed by the second classifier.

Examples of sequence 1400 include those illustrated in FIG. 6, with the first cascade classifier being classifier 602, and the second cascade classifier being classifier 604. For instance, in stage 0 of the first cascade classifier 602, certain features may be calculated and the result evaluated against a threshold. The outcome condition may match a pass condition if the threshold is met or surpassed, indicating detection of a target feature, and the system proceeds to the next stage (stage 1) of the first cascade classifier 602. On the other hand, the outcome condition may match a fail condition if the threshold is not met or surpassed, indicating failure to detect the target feature, and the system conditionally branches from the first cascade classifier 602 to a stage (stage 0) of the second cascade classifier 604. Further details regarding the operation of the first cascade classifier 602 and second cascade classifier 604 are discussed in previous sections with respect to FIG. 6.

Figure 14B:
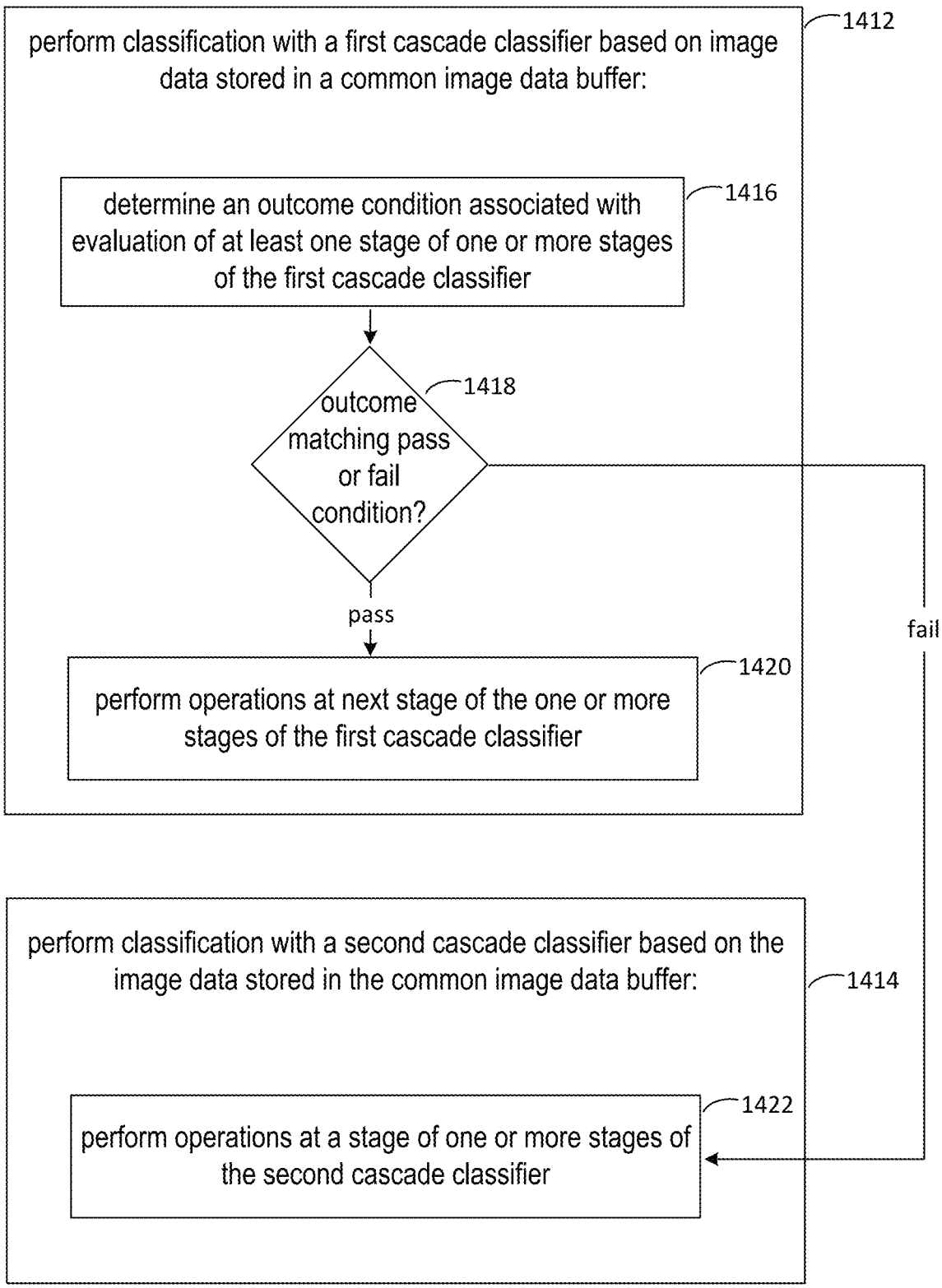
FIG. 14B is a more detailed flow chart showing a conditional branch sequence 1410 from a first cascade classifier to a second cascade classifier, according to an embodiment of the present disclosure.

FIG. 14B is a more detailed flow chart showing a conditional branch sequence 1410 from a first cascade classifier to a second cascade classifier, according to an embodiment of the present disclosure. Conditional branch sequence 1410 shown in FIG. 14B may be an example of the conditional branch sequence 1400 shown in FIG. 14A. As such, details mentioned previously with respect to the conditional sequence 1400 may also be applicable to conditional sequence 1410. As shown, conditional sequence 1410 comprises illustrative steps 1412 and 1414. At step 1412, the system performs classification with a first cascade classifier based on image data stored in a common image data buffer. Step 1412 may comprise sub-steps 1416, 1418, and 1420. At sub-step 1416, the system determines an outcome condition associated with evaluation of at least one stage of one or more stages of the first cascade classifier. At sub-step 1418, the system determines whether the outcome condition matches a pass condition or a fail condition. At sub-step 1420, responsive to the outcome condition matching a pass condition, the system proceeds to and performs operations at a next stage of the one or more stages of the first cascade classifier. Means for performing step 1412, including sub-steps 1416, 1418, and 1420 can, but not necessarily, include, for example, hardware engine 202 in FIG. 2, hardware engine 302 in FIG. 3, processing unit(s) 1710 in FIG. 17, and/or digital signal processing unit (DSP) 1720 in FIG. 17.

Responsive to the outcome condition matching a fail condition, the system conditionally branches from the first cascade classifier to a stage of one or more stages of the second cascade classifier. Here, at step 1414, the system performs classification with a second cascade classifier based on the image data stored in the common image data buffer. Step 1414 may comprise sub-step 1422. Thus, responsive to the outcome condition matching the fail condition, the system may conditionally branch to sub-step 1422. At sub-step 1422, the system performs operations at a stage of one or more stages of the second cascade classifier. Means for performing step 1414, including sub-step 1422 can, but not necessarily, include, for example, lower level hardware components such as the circuitry shown in FIG. 12B, hardware engine 202 in FIG. 2, hardware engine 302 in FIG. 3, processing unit(s) 1710 in FIG. 17, and/or digital signal processing unit (DSP) 1720 in FIG. 17. According to an embodiment, the first cascade classifier and the second cascade classifier may be configured to perform classification based on image data stored in a common image data buffer. Also, the first cascade classifier may be configured to perform classification different from a classification performed by the second classifier.

According to an embodiment of the disclosure, at steps 1412 and 1414, performing the classification with the first cascade classifier comprises performing object detection on a first window size of the image data, and performing the classification with the second cascade classifier comprises performing object detection on a second window size of the image data different from the first window size. Means for performing object detection on the first window size of the image and performing object detection on a second window size of the image data different from the first window size can, but not necessarily, include, for example, hardware engines 202 and 204 in FIG. 2, hardware engine 302 in FIG.

Figure 17:
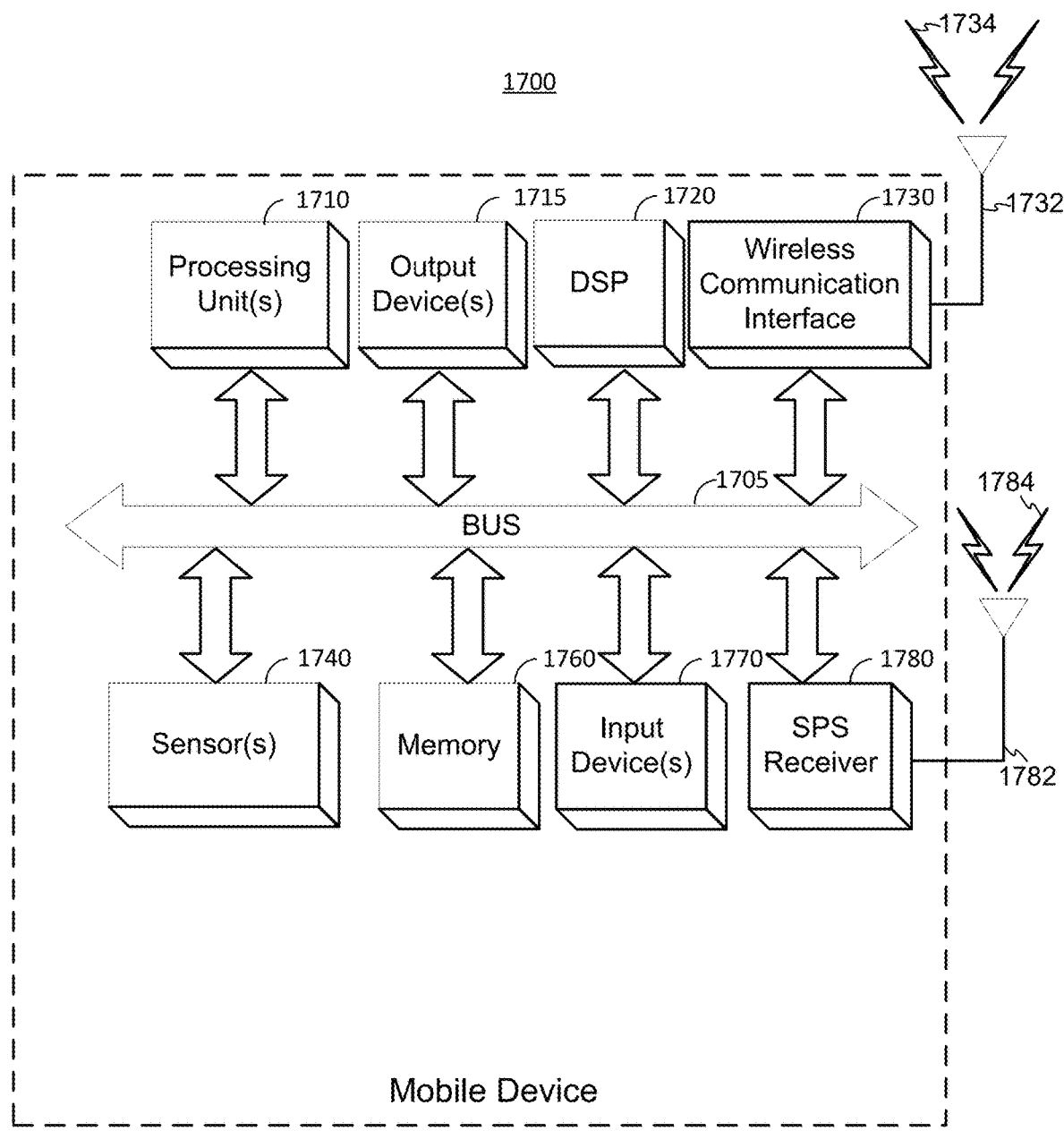
FIG. 17 is a block diagram of internal components of a device that may utilize the techniques and features described herein, according to an embodiment.

3, processing unit(s) 1710 in FIG. 17, and/or digital signal processing unit (DSP) 1720 in FIG. 17.

According to an embodiment of the disclosure, at steps 1412 and 1414, performing the classification with the first cascade classifier comprises performing object detection of a first object class, and performing the classification with the second cascade classifier comprises performing object detection of a second object class different from the first object class. Means for performing object detection of the first object class and performing object detection of the second object class can, but not necessarily, include, for example, hardware engines 202 and 204 in FIG. 2, hardware engine 302 in FIG. 3, processing unit(s) 1710 in FIG. 17, and/or digital signal processing unit (DSP) 1720 in FIG. 17.

Figure 15:
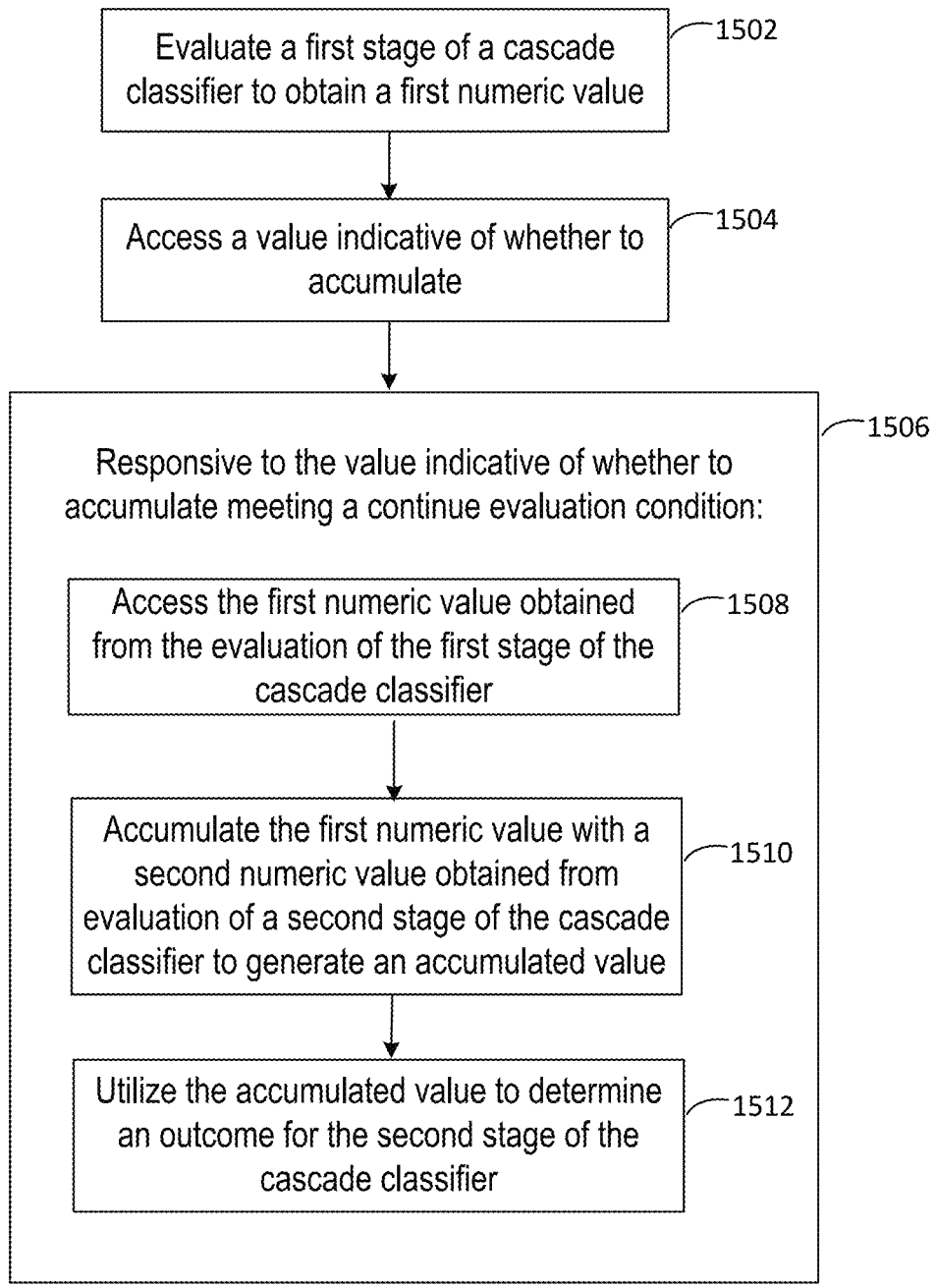
FIG. 15 is a flow chart showing a process for performing classification using a value accumulated across stages, according to an embodiment of the disclosure.

FIG. 15 is a flow chart showing a process 1500 for performing classification using a value accumulated across stages, according to an embodiment of the disclosure. As shown, process 1500 involves steps 1502, 1504, and 1506. Step 1506 further comprises sub-steps 1508, 1510, and 1512. At step 1502, a first stage of a cascade classifier is evaluated to obtain a first numeric value. At step 1504, a value indicative of whether to accumulate is accessed. At step 1506, responsive to the value indicative of whether to accumulate meeting a continue evaluation condition, sub-steps 1508, 1510, and 1512 are performed. Means for performing steps 1502, 1504, and 1506 can, but not necessarily, include, for example, lower level hardware components such as the circuitry shown in FIG. 13, hardware engine 202 in FIG. 2, hardware engine 302 in FIG. 3, processing unit(s) 1710 in FIG. 17, and/or digital signal processing unit (DSP) 1720 in FIG. 17. At sub-step 1508, the process involves accessing the first numeric value obtained from evaluating the first stage of the cascade classifier. At sub-step 1510, the process involves accumulating the first numeric value with a second numeric value obtained during evaluating a second stage of the cascade classifier, to generate an accumulated value. At sub-step 1512, the process involves utilizing the accumulated value to determine an outcome for the second stage of the cascade classifier. Means for performing sub-steps 1508, 1510, and 1512 can, but not necessarily, include, for example, lower level hardware components such as the circuitry shown in FIG. 13B, hardware engine 202 in FIG. 2, hardware engine 302 in FIG. 3, processing unit(s) 1710 in FIG. 17, and/or digital signal processing unit (DSP) 1720 in FIG. 17.

One example of the process 1500 is the "early pass" operation shown in FIG. 10, which is described in detail previously. In this example, the first stage of the cascade classifier may be stage 1*a* shown in FIG. 10. Evaluation of the features associated with stage 1*a* may yield a first numeric value. Then, responsive to a condition, e.g., the first numeric value meeting or not meeting an "early pass" threshold, a second stage of the cascade classifier is evaluated. Here, the second stage may be stage 1*b* shown in FIG. 10. In one pass of the cascade classifier, the first numeric value may not meet the "early pass" threshold. In such a case, "early pass" is not possible, and stage 1*b* is not bypassed. Instead, stage 1*b* is evaluated. Here, evaluating stage 1*b* may comprise a number of sub-steps, including accessing the first numeric value obtained from evaluating stage 1*a*, accumulating the first numeric value with a second numeric value obtained during evaluation of the second stage, i.e., stage 1*b* of FIG. 10, to generate an accumulated value, and using the accumulated value to determine the outcome of stage 1*b*. In another pass of the cascade classifier, the first numeric value may meet the "early pass" threshold. In such a case, "early pass" is possible, and stage 1*b* is bypassed. When the cascade classifier is executed multiple times, operation over the multiple executions may involve at least one execution in which "early pass" occurs and at least one execution in which "early pass" does not occur. Thus, an overall process may be viewed as including both "early pass" steps and steps associated with not performing "early pass."

Another example of the process 1500 is the "early fail" operation shown in FIG. 11, which is also described in detail previously. In this example, the first stage of the cascade classifier may be stage 1*a* shown in FIG. 11. Evaluation of the features associated with stage 1*a* may yield a first numeric value. Then, responsive to a condition, e.g., the first numeric value meeting or not meeting an "early fail" threshold, a second stage of the cascade classifier is evaluated. Here, the second stage may be stage 1*b* shown in FIG. 11. In one pass of the cascade classifier, the first numeric value may not meet the "early fail" threshold. In such a case, "early fail" is not possible, and stage 1*b* is evaluated. Here, evaluating stage 1*b* may comprise a number of sub-steps, including accessing the first numeric value obtained from evaluating stage 1*a*, accumulating the first numeric value with a second numeric value obtained during evaluation of the second stage, i.e., stage 1*b* of FIG. 11, to generate an accumulated value, and using the accumulated value to determine the outcome of stage 1*b*. In another pass of the cascade classifier, the first numeric value may meet the "early fail" threshold. In such a case, "early fail" is possible, and the cascade classifier exits execution with the "failed" outcome. When the cascade classifier is executed multiple times, operation over the multiple executions may involve at least one execution in which "early fail" occurs and at least one execution in which "early fail" does not occur. Thus, an overall process may be viewed as including both "early fail" steps and steps associated with not performing "early fail."

Figure 16:
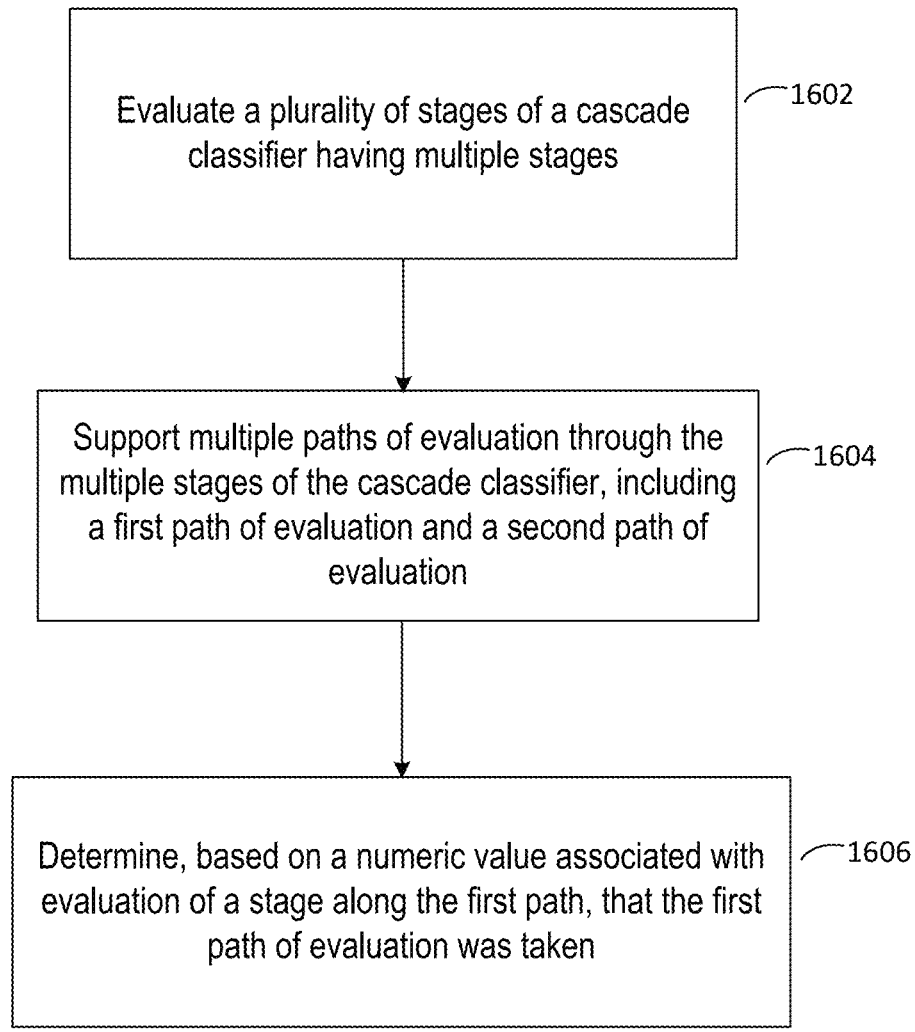
FIG. 16 is a flow chart showing a process for resolving ambiguity in a branched cascade path while performing a classification task, according to an embodiment of the disclosure.

FIG. 16 is a flow chart showing a process 1600 for resolving ambiguity in a branched cascade path while performing a classification task, according to an embodiment of the disclosure. As shown, process 1600 involves steps 1602, 1604, and 1606. At step 1602, the process involves evaluating a plurality of stages of a cascade classifier having multiple stages. An example of such a cascade classifier is a combined cascade classifier 606 comprising cascade classifiers 602 and 604 shown in FIG. 6. In step 1604, multiple paths of evaluation through the multiple stages of the cascade classifier are supported, including a first path of evaluation and a second path of evaluation. Referring again to FIG. 6, an example of a first path of evaluation may be a path "X" through stages associated with hardware stage identifiers 0, 1, 2, 3, 4, and 9. An example of a second path of evaluation maybe path "Y" through stages associated with hardware stage identifiers 0, 5, 6, 7, 8, and 9. In step 1606, the process involves determining, based on a numeric value associated with evaluation of a stage along the first path, that the first path of evaluation was taken. In the same example, the accumulated value for the combined cascade classifier 606 may be stored, e.g., as a 32-bit unsigned integer. The accumulated value may be reset upon entering the combined cascade classifier 606. At each stage, the stage may add a number to the value stored in the "accumulate" register and write the resulting sum back into the "accumulate register." In this simple example, all of the stages except the stage associated with hardware stage identifier 3 would add "0" to the accumulated value. By contrast, the stage associated with hardware stage identifier 3 would add a nominal value, say "1000" to the accumulated value. Upon reaching the "Found Object" result, the ambiguity between path "X" and "Y" may be resolved by simply inspecting the value in the accumulate register. An accumulate value of "1000" in the register would indicate that the combined cascade classifier 606 passed through the stage associated with hardware stage identifier 3, and the "X" path was traversed. Means for performing steps 1602, 1604, and 1606 can, but not necessarily, include, for example, hardware engine 202 in FIG. 2, hardware engine 302 in FIG. 3, processing unit(s) 1710 in FIG. 17, and/or digital signal processing unit (DSP) 1720 in FIG. 17.

The steps shown in FIGS. 14A, 14B, 15, and 16, can be implemented in hardware using digital logic, state machine(s), programmable logic device(s) such as field programmable gate array (FPGA), and/or special purpose processor(s) or application-specific integrated circuit(s) as well as in software where, for example, general purpose processor(s) execute programmed instructions, or any combination thereof, including illustrative components and devices specifically described in the present disclosure.

The methods or processes for classification described in the present disclosure, including those described in connection with FIGS. 14A, 14B, 15, and 16, may be performed using hardware such as hardware engines 202 and 204 shown in FIG. 2 and hardware engine 302 shown in FIG. 3 and associated cascades classifiers. Use of hardware to perform such techniques may be associated with greater speed, efficiency, and lower power consumption. However, the methods and processes for classification described in the present disclosure may also be performed using one or more processors, such as general purpose processing units, carrying out programmed instructions, according to other embodiments of the disclosure.

FIG. 17 is a block diagram of internal components of a device 1700 that may utilize the techniques and features described herein, according to an embodiment. It should be noted that FIG. 17 is meant only to provide a generalized illustration of various components, any or all of which may be utilized as appropriate. It can be noted that, in some instances, components illustrated by FIG. 17 can be localized to a single physical device and/or distributed among various networked devices, which may be disposed at different physical locations.

The device 1700 is shown comprising hardware elements that can be electrically coupled via a bus 1705 (or may otherwise be in communication, as appropriate). The hardware elements may include one or more processing unit(s) 1710 which can include without limitation one or more general-purpose processors, one or more special-purpose processors (such as digital signal processing (DSP) chips, graphics acceleration processors, application specific integrated circuits (ASICs), and/or the like), and/or other processing structure or means. In the embodiments described above, the one or more processing unit(s) 1710 may incorporate hardware engines such as hardware engines 202 and 204 shown in FIG. 2 or hardware engine 302 shown in FIG. 3. As shown in FIG. 17, some embodiments may have a separate DSP 1720, depending on desired functionality. Alternatively or additionally, DSP 1720 may incorporate hardware engines such as hardware engine 202 and 204 shown in FIG. 2 or hardware engine 302 shown in FIG. 3. The device 1700 also can include one or more input devices 1770, which can include without limitation a touch screen, a touch pad, microphone, button(s), dial(s), switch(es), and/or the like; and one or more output devices 1715, which can include without limitation a display, light emitting diode (LED), speakers, and/or the like.

The device 1700 might also include a wireless communication interface 1730, which can include without limitation a modem, a network card, an infrared communication device, a wireless communication device, and/or a chipset (such as a Bluetooth™ device, an 802.11 device (i.e., a device operating in accordance with the Institute of Electrical and Electronics Engineers (IEEE) 802.11 specification), an 802.16.4 device, a WiFi device, a WiMax device, cellular communication facilities, etc.), and/or the like. The wireless communication interface 1730 may permit data to be exchanged with a network, wireless access points, other computer systems, and/or any other electronic devices described herein. The communication can be carried out via one or more wireless communication antenna(s) 1732 that send and/or receive wireless signals 1734.

Depending on desired functionality, the wireless communication interface 1730 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). An OFDMA network may employ Long Term Evolution (LTE), LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A Wireless Local Area Network (WLAN) may also be an IEEE 802.11x network, and a Wireless Personal Area Network (WPAN) may be a Bluetooth network, an IEEE 802.16x, or some other type of network. The techniques described herein may also be used for any combination of WWAN, WLAN and/or WPAN.

The device 1700 can further include sensor(s) 1740. Such sensors can include, without limitation, one or more accelerometer(s), gyroscope(s), camera(s), magnetometer(s), altimeter(s), microphone(s), proximity sensor(s), light sensor(s), and the like. For instance, image data referred to above may be captured using a camera, which may be an instance of sensor(s) 1740. Additionally or alternatively, sensor(s) 1740 may include an always-on vision sensor capable performing object detection in accordance with various implementations and embodiments described herein using an integrated camera or using image data received by the always-on vision sensor from a non-integrated camera sensor. Such an always-on vision sensor may include various aspects described above.

Embodiments of the device may also include a Satellite Positioning System (SPS) receiver 1780 capable of receiving signals 1784 from one or more SPS satellites using an SPS antenna 1782. The SPS receiver 1780 can extract a position of the device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1780 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The device 1700 may further include and/or be in communication with a memory 1760. The memory 1760 may incorporate memory and/or registers such as memory/register(s) 212 and 216 shown in FIG. 2, as well as memory/register(s) 312 of FIG. 3. Furthermore, memory 1760 may incorporate stage databases such as stage database 218 shown in FIG. 2 and stage database 318 shown in FIG. 3. The memory 1760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1760 of the device 1700 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include a non-transitory machine-readable medium storing instructions for performing the methods of FIGS. 14A, 14B, 15, and/or 16. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention.

Also, a number of steps may be undertaken before, during, or after the above elements are considered. Accordingly, the above description does not limit the scope of the disclosure.

What is claimed is:

1. A hardware-based classification apparatus comprising:
a hardware engine configurable to implement a plurality of cascade classifiers comprising at least a first cascade classifier and a second cascade classifier, the hardware engine configurable to implement one or more stages within each of the plurality of cascade classifiers, wherein
each of the one or more stages within each of the plurality of cascade classifiers includes a respective memory location,
the first cascade classifier and the second cascade classifier are configured to perform classification based on image data stored in a common image data buffer,
the first cascade classifier is configured to perform a classification different from a classification performed by the second cascade classifier, and
the hardware engine is capable of conditionally branching from any stage of the one or more stages of the first cascade classifier to the second cascade classifier based on an outcome condition associated with evaluating of the any stage of the first cascade classifier.

2. The apparatus of claim 1, wherein the image data stored in the common image data buffer comprises image data representing a portion of an image, a portion of an integral image, or an integral image of a portion of the image.

3. The apparatus of claim 2, wherein the first cascade classifier is configured to perform object detection on a first window size of the image data and the second cascade classifier is configured to perform object detection on a second window size of the image data different from the first window size.

4. The apparatus of claim 1, wherein the first cascade classifier is configured to perform object detection of a first object class and the second cascade classifier is configured to perform object detection of a second object class different from the first object class.

5. The apparatus of claim 1, wherein the outcome condition comprises a branch-on-fail condition corresponding to a failure by at least one stage of the first cascade classifier to detect an object within a window of the image data stored in the common image data buffer.

6. The apparatus of claim 1, wherein each of the one or more stages within each of the plurality of cascade classifiers corresponds to a hardware stage associated with each respective memory location, each hardware stage storing stage data to enable the hardware engine to implement each of the one or more stages, wherein each hardware stage is associated with a unique hardware stage identifier.

7. The apparatus of claim 6, wherein hardware stages implementing logical stages of the first cascade classifier and similar logical stages of the second cascade classifier are assigned hardware stage identifiers within a common range of values.

8. The apparatus of claim 6, wherein the apparatus is configured to record a value representing a highest hardware stage identifier reached during an execution of the hardware engine.

9. The apparatus of claim 1, wherein the hardware engine has access to memory to enable storing of stage-related data usable by the hardware engine of the plurality of cascade classifiers.

10. The apparatus of claim 1, wherein each stage within the first cascade classifier and the second cascade classifier employs a modular design having similar hardware capabilities as other stages within the first cascade classifier and second cascade classifier.

11. A method for performing classification comprising:
performing classification with a first cascade classifier based on image data stored in a common image data buffer; and
performing classification with a second cascade classifier based on the image data stored in the common image data buffer, wherein the classification performed by the second cascade classifier is different from the classification performed by the first cascade classifier, wherein performing the classification with the first cascade classifier comprises:
determining an outcome condition associated with evaluation of at least one stage of one or more stages of the first cascade classifier, each of the one or more stages of the first cascade classifier including a respective memory location,
responsive to the outcome condition matching a pass condition, proceeding to a next stage of the one or more stages of the first cascade classifier, and
responsive to the outcome condition matching a fail condition, conditionally branching from the at least one stage of the one or more stages of the first cascade classifier to a stage of one or more stages of the second cascade classifier, wherein the first cascade classifier is capable of conditionally branching from any stage of the one or more stages to the second cascade classifier based on the outcome condition.

12. The method of claim 11, wherein the image data stored in the common image data buffer comprises image data representing a portion of an image, a portion of an integral image, or an integral image of a portion of the image.

13. The method of claim 12, wherein performing the classification with the first cascade classifier comprises performing object detection on a first window size of the image data, and performing the classification with the second cascade classifier comprises performing object detection on a second window size of the image data different from the first window size.

14. The method of claim 11, wherein performing the classification with the first cascade classifier comprises performing object detection of a first object class, and performing the classification with the second cascade classifier comprises performing object detection of a second object class different from the first object class.

15. The method of claim 11, wherein the outcome condition comprises a branch-on-fail condition corresponding to a failure by the at least one stage of the first cascade classifier to detect an object within a window of the image data stored in the common image data buffer.

16. The method of claim 11, wherein each of the one or more stages of the first cascade classifier corresponds to a hardware stage associated with each respective memory location, each hardware stage storing stage data to enable implementing each of the one or more stages, wherein each hardware stage is associated with a unique hardware stage identifier.

17. The method of claim 16, wherein hardware stages implementing logical stages of the first cascade classifier and similar logical stages of the second cascade classifier are assigned hardware stage identifiers within a common range of values.

18. The method of claim 16, further comprising recording a value representing a highest hardware stage identifier reached during an execution of the first cascade classifier and the second cascade classifier.

19. The method of claim 11, further comprising storing stage-related data across different cascade classifiers of a plurality of cascade classifiers.

20. The method of claim 11, wherein each stage of the first cascade classifier and the second cascade classifier employs a modular design having similar hardware capabilities as other stages within the first cascade classifier and second cascade classifier.

21. A system for performing classification comprising:
means for performing classification with a first cascade classifier based on image data stored in a common image data buffer; and
means for performing classification with a second cascade classifier based on the image data stored in the common image data buffer, wherein the classification performed by the second cascade classifier is different from the classification performed by the first cascade classifier, wherein the means for performing the classification with the first cascade classifier comprises:
means for determining an outcome condition associated with evaluation of at least one stage of one or more stages of the first cascade classifier, each of the one or more stages of the first cascade classifier including a respective memory location,
means for, responsive to the outcome condition matching a pass condition, proceeding to a next stage of the one or more stages of the first cascade classifier, and
means for, responsive to the outcome condition matching a fail condition, conditionally branching from the at least one stage of the one or more stages of the first cascade classifier to a stage of one or more stages of the second cascade classifier, wherein the first cascade classifier is capable of conditionally branching from any stage of the one or more stages to the second cascade classifier based on the outcome condition.

22. The system of claim 21, wherein the image data stored in the common image data buffer comprises image data representing a portion of an image, a portion of an integral image, or an integral image of a portion of the image.

23. The system of claim 22, wherein the means for performing the classification with the first cascade classifier comprises means for performing object detection on a first window size of the image data, and the means for performing the classification with the second cascade classifier comprises means for performing object detection on a second window size of the image data different from the first window size.

24. The system of claim 21, wherein the means for performing the classification with the first cascade classifier comprises means for performing object detection of a first object class, and the means for performing the classification with the second cascade classifier comprises means for performing object detection of a second object class different from the first object class.

25. The system of claim 21, wherein the outcome condition comprises a branch-on-fail condition corresponding to a failure by the at least one stage of the first cascade classifier to detect an object within a window of the image data stored in the common image data buffer.

26. The system of claim 21, wherein each of the one or more stages of the first cascade classifier corresponds to a hardware stage associated with each respective memory location, each hardware stage storing stage data to enable implementing each of the one or more stages, wherein each hardware stage is associated with a unique hardware stage identifier.

27. The system of claim 26, wherein hardware stages implementing logical stages of the first cascade classifier and similar logical stages of the second cascade classifier are assigned hardware stage identifiers within a common range of values.

28. The system of claim 26, further comprising means for recording a value representing a highest hardware stage identifier reached during an execution of the first cascade classifier and the second cascade classifier.

29. The system of claim 21, wherein each stage within the first cascade classifier and the second cascade classifier employs a modular design having similar hardware capabilities as other stages within the first cascade classifier and second cascade classifier.

30. A non-transitory computer-readable medium storing instructions therein for execution by one or more processing units, comprising instructions to:
perform classification with a first cascade classifier based on image data stored in a common image data buffer; and
perform classification with a second cascade classifier based on the image data stored in the common image data buffer, wherein the classification performed by the second cascade classifier is different from the classification performed by the first cascade classifier, wherein the instructions to perform the classification with the first cascade classifier comprises instructions to:
determine an outcome condition associated with evaluation of at least one stage of one or more stages of the first cascade classifier, each of the one or more stages of the first cascade classifier including a respective memory location,
responsive to the outcome condition matching a pass condition, proceed to a next stage of the one or more stages of the first cascade classifier, and
responsive to the outcome condition matching a fail condition, conditionally branch from the at least one stage of the one or more stages of the first cascade classifier to a stage of one or more stages of the second cascade classifier, wherein the first cascade classifier is capable of conditionally branching from any stage of the one or more stages to the second cascade classifier based on the outcome condition.

* * * * *